US007000777B2

(12) United States Patent
Adams et al.

(10) Patent No.: US 7,000,777 B2
(45) Date of Patent: Feb. 21, 2006

(54) VIBRATORY SEPARATOR SCREENS

(75) Inventors: Thomas C. Adams, Hockley, TX (US); David L. Schulte, Jr., Broussard, LA (US); Kenneth W. Seyffert, Houston, TX (US); David Wayne Laragent, Cleveland, TX (US); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 320 days.

(21) Appl. No.: 10/614,697

(22) Filed: Jul. 7, 2003

(65) Prior Publication Data
US 2004/0074817 A1 Apr. 22, 2004

Related U.S. Application Data

(60) Division of application No. 10/236,050, filed on Sep. 5, 2002, now abandoned, which is a continuation-in-part of application No. 10/210,891, filed on Jul. 31, 2002, now Pat. No. 6,932,883, which is a continuation-in-part of application No. 10/037,474, filed on Oct. 19, 2001, now Pat. No. 6,669,985, which is a division of application No. 09/707,227, filed on Nov. 6, 2000, now Pat. No. 6,581,781, which is a continuation-in-part of application No. 09/603,531, filed on Jun. 27, 2000, now Pat. No. 6,450,345, which is a continuation-in-part of application No. 09/517,212, filed on Mar. 2, 2000, now Pat. No. 6,565,698, which is a continuation-in-part of application No. 09/454,722, filed on Dec. 4, 1999, now abandoned, which is a continuation-in-part of application No. 09/390,231, filed on Sep. 3, 1999, now Pat. No. 6,325,216, said application No. 10/614,697 is a continuation-in-part of application No. 09/183,004, filed on Oct. 30, 1998, now Pat. No. 6,186,337.

(51) Int. Cl.
*B07B 1/46* (2006.01)

(52) U.S. Cl. ..................... 209/399; 209/403
(58) Field of Classification Search ............... 209/397, 209/399, 401, 403; 210/499
See application file for complete search history.

(56) References Cited

U.S. PATENT DOCUMENTS

| 235,851 | A | | 12/1880 | Bourne | |
|---|---|---|---|---|---|
| 236,416 | A | | 1/1881 | Bourne | |
| 3,031,827 | A | * | 5/1962 | Frohmader et al. | ............ 55/526 |
| 3,374,888 | A | * | 3/1968 | Volpert et al. | .............. 209/319 |
| 3,506,133 | A | * | 4/1970 | Lee | ............................ 210/491 |
| 4,028,230 | A | | 6/1977 | Rosenblum | ................. 209/403 |
| 4,224,146 | A | | 9/1980 | Kent et al. | .................. 209/243 |
| 4,306,974 | A | | 12/1981 | Harry | ........................ 210/388 |
| 4,375,199 | A | | 3/1983 | Graeme-Barber et al. | .. 144/222 |

(Continued)

FOREIGN PATENT DOCUMENTS

CH 603207 8/1978 ................. 210/499

(Continued)

OTHER PUBLICATIONS

"The Derrick LP Sandwich Shaker," Derrick Equipment Col, 1981.

(Continued)

*Primary Examiner*—Donald P. Walsh
*Assistant Examiner*—Joseph C. Rodriguez
(74) *Attorney, Agent, or Firm*—Guy McClung

(57) ABSTRACT

Screen assemblies for a vibratory separator, the screen assemblies in certain aspects having at least two screening members, the at least two screening members connected by sewing material, and methods for making such screen assemblies.

16 Claims, 21 Drawing Sheets

U.S. PATENT DOCUMENTS

| | | | | |
|---|---|---|---|---|
| 4,446,022 A | 5/1984 | Harry | | 210/388 |
| 4,457,839 A | 7/1984 | Bailey | | 209/234 |
| 4,575,421 A | 3/1986 | Derrick et al. | | 209/397 |
| 4,603,653 A | 8/1986 | Bews | | 116/209 |
| 4,728,422 A | 3/1988 | Bailey | | 210/314 |
| 4,744,898 A | 5/1988 | Bailey | | 210/236 |
| 4,846,352 A | 7/1989 | Bailey | | 209/399 |
| 5,084,174 A | 1/1992 | Perala et al. | | 210/331 |
| 5,137,622 A | 8/1992 | Souter | | 209/403 |
| 5,626,234 A | 5/1997 | Cook et al. | | 209/315 |
| 5,636,749 A | * 6/1997 | Wojciechowski | | 209/403 |
| 5,667,661 A | 9/1997 | Hughes | | 205/138 |
| 5,783,077 A | 7/1998 | Bakula | | 210/388 |
| 5,819,952 A | 10/1998 | Cook et al. | | 209/400 |
| 5,868,929 A | 2/1999 | Derrick et al. | | 210/388 |
| 5,876,552 A | 3/1999 | Bakula | | 156/308.2 |
| 5,921,399 A | 7/1999 | Bakula et al. | | 209/272 |
| 5,927,511 A | 7/1999 | Riddle et al. | | 209/405 |
| 5,944,197 A | 8/1999 | Baltzer et al. | | 209/400 |
| 5,944,993 A | 8/1999 | Derrick et al. | | 210/388 |
| 5,958,236 A | 9/1999 | Bakula | | 210/388 |
| 5,967,336 A | 10/1999 | Baltzer et al. | | 209/403 |
| 6,053,332 A | 4/2000 | Bakula | | 210/388 |
| 6,269,954 B1 | 8/2001 | Baltzer | | 209/405 |
| 6,431,368 B1 | 8/2002 | Carr | | 209/403 |
| 6,439,392 B1 | 8/2002 | Baltzer | | 209/405 |
| 2002/0000399 A1 | 1/2002 | Winkler et al. | | |

FOREIGN PATENT DOCUMENTS

| | | |
|---|---|---|
| EP | 0 169698 | 1/1986 |
| GB | 1 561 802 | 3/1980 |
| GB | 1575312 | 9/1980 |
| GB | 1578948 | 11/1980 |
| GB | 2085744 | 5/1982 |
| GB | 2161715 | 1/1986 |
| GB | 2162091 | 1/1986 |
| GB | 2175222 | 11/1986 |
| GB | 2206501 | 1/1989 |
| GB | 2312858 | 11/1997 |
| JP | 02014707 A * | 1/1990 |
| WO | WO 01/39861 A1 | 6/2001 |
| WO | WO 02/00360 A1 | 1/2002 |

OTHER PUBLICATIONS

"The Future of Fine Screening," Derrick Equipment Co., 1993.
"Derrick Pyramid Screens," Derrick Corp., 1994.
"Derrick Pyramid Screens," Derrick Corp., 1993.
"Layered Shale Shaker Screens Improve Mud Solids Control," Cagle et al, World Oil, 1978.
Int'l Search Report PCT/GB03/63839, PCT counterpart of U.S. Appl. No. 10/236,050, Apr. 2003.

* cited by examiner

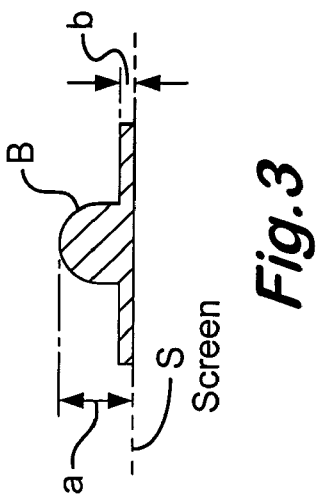
Fig.3
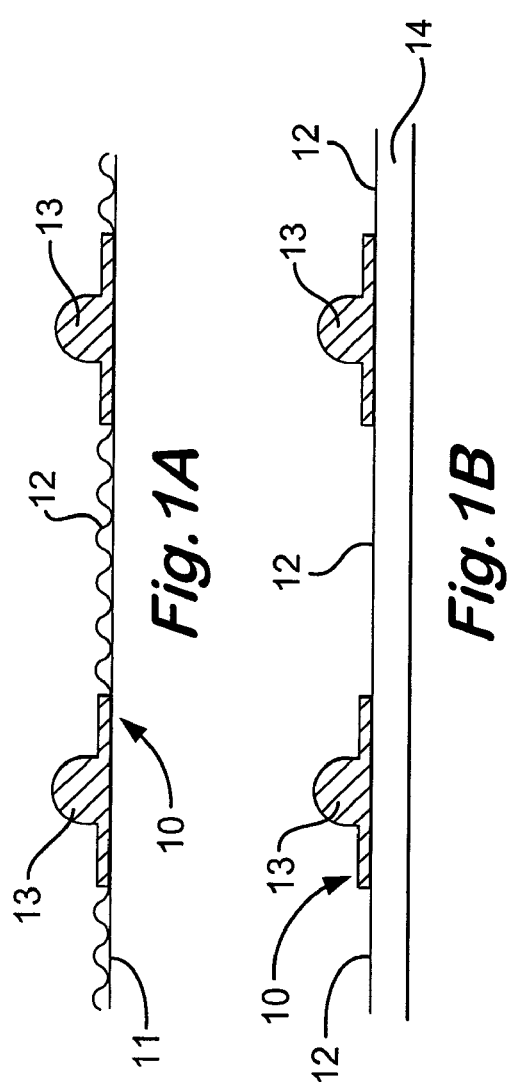
Fig.1A
Fig.1B
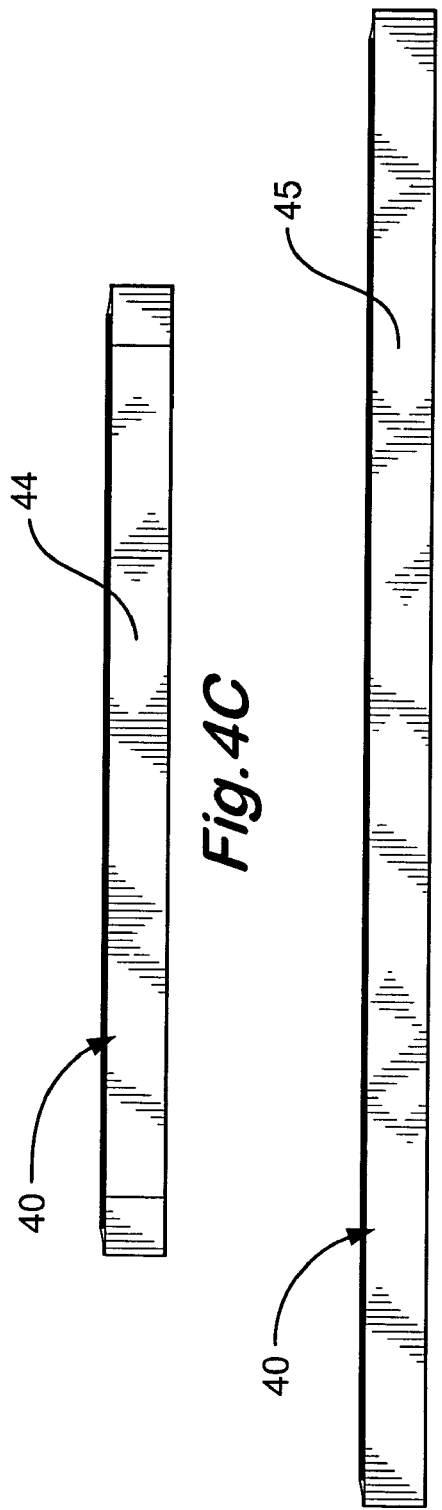
Fig.4C
Fig.4D

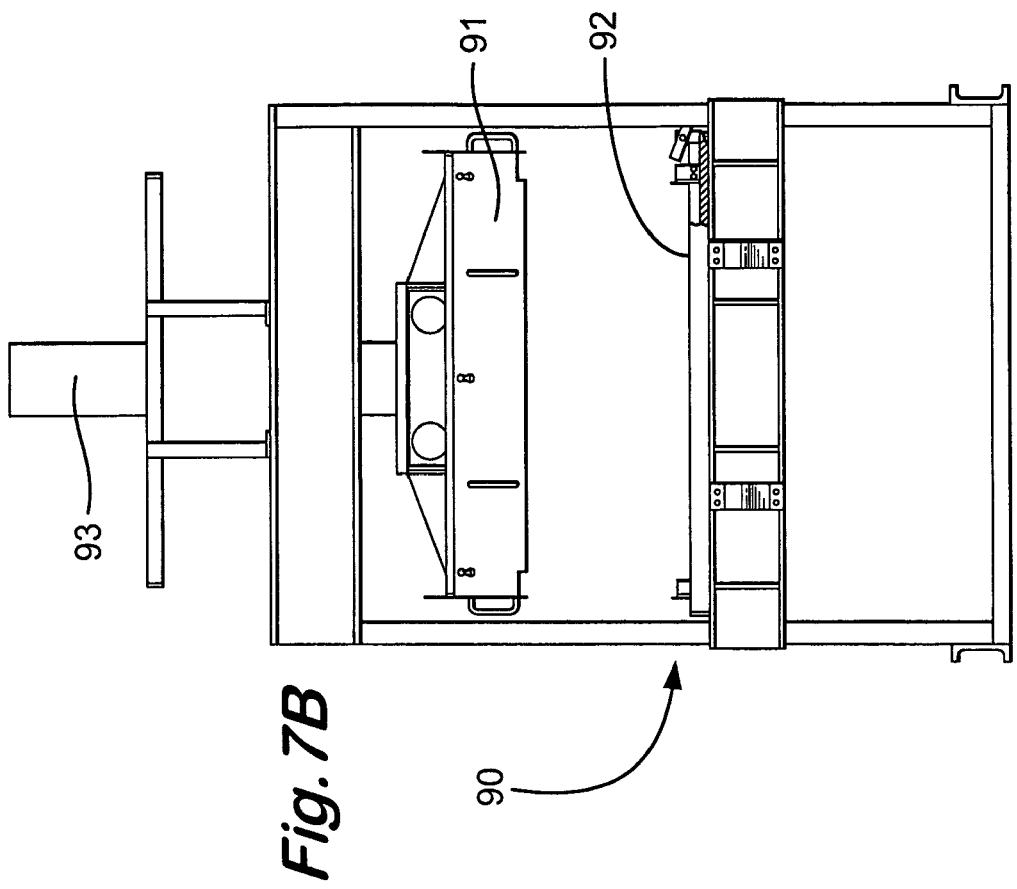
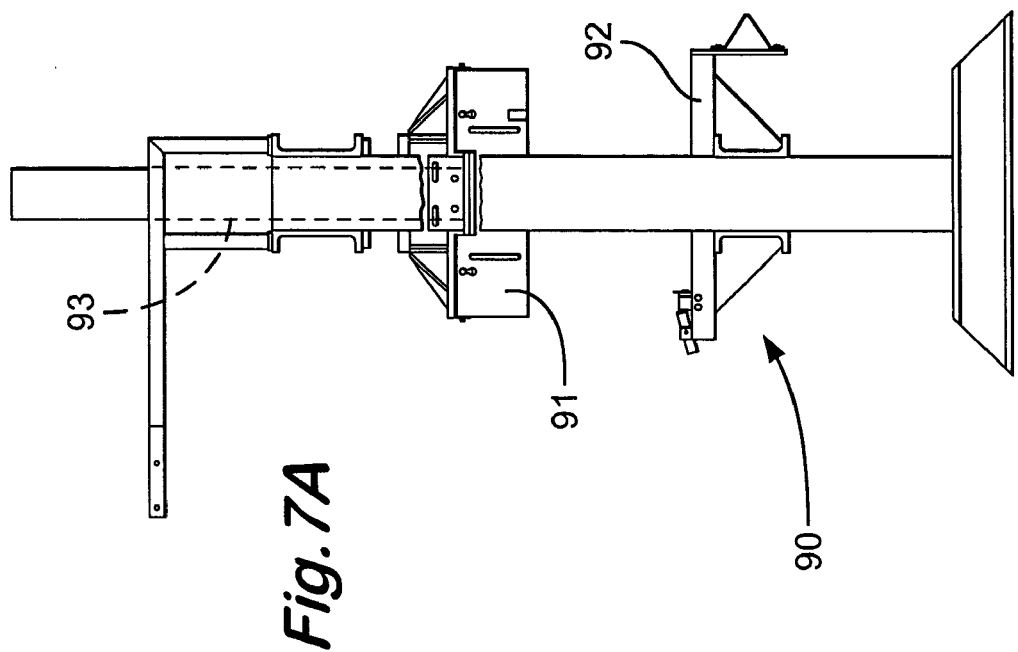

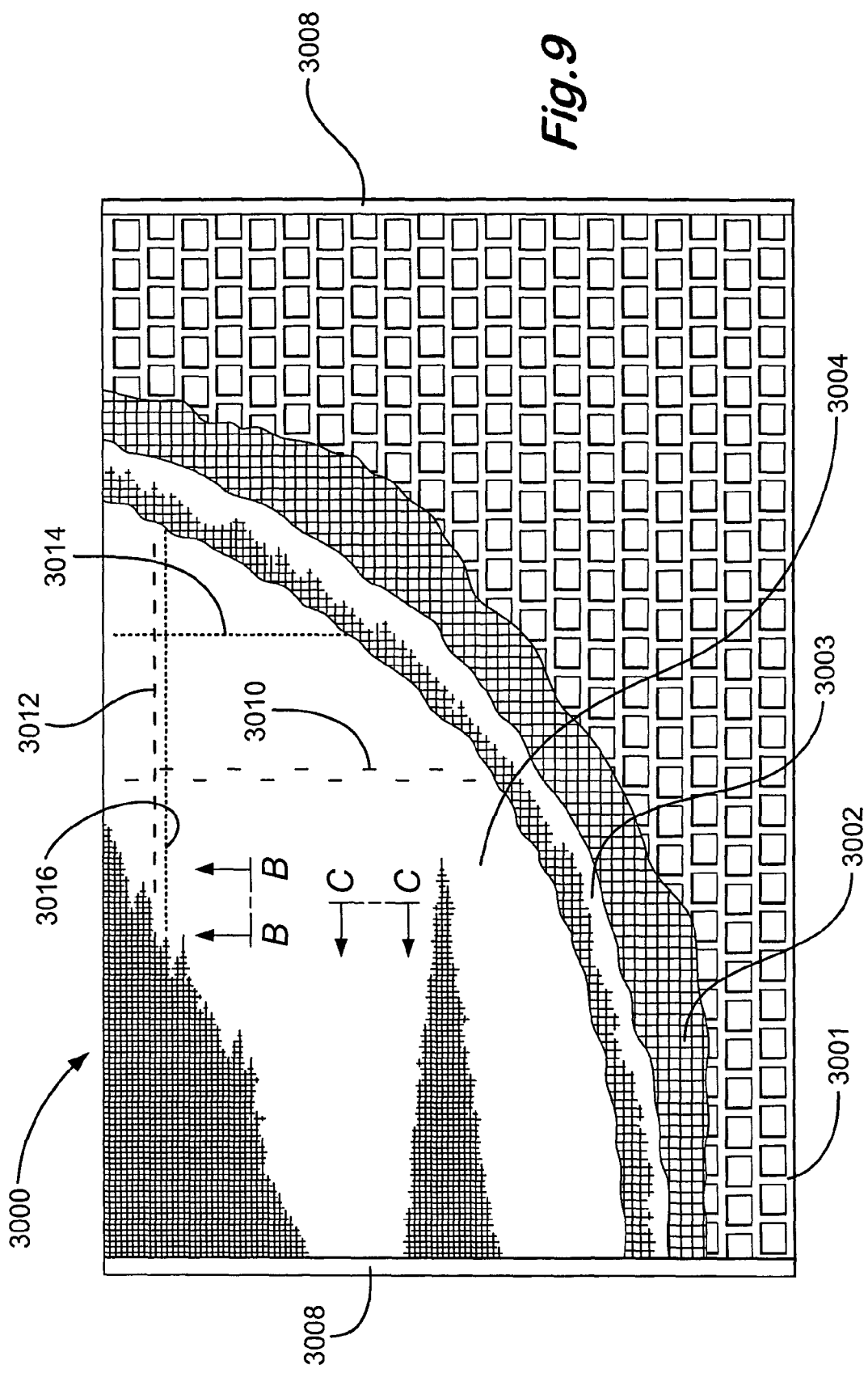

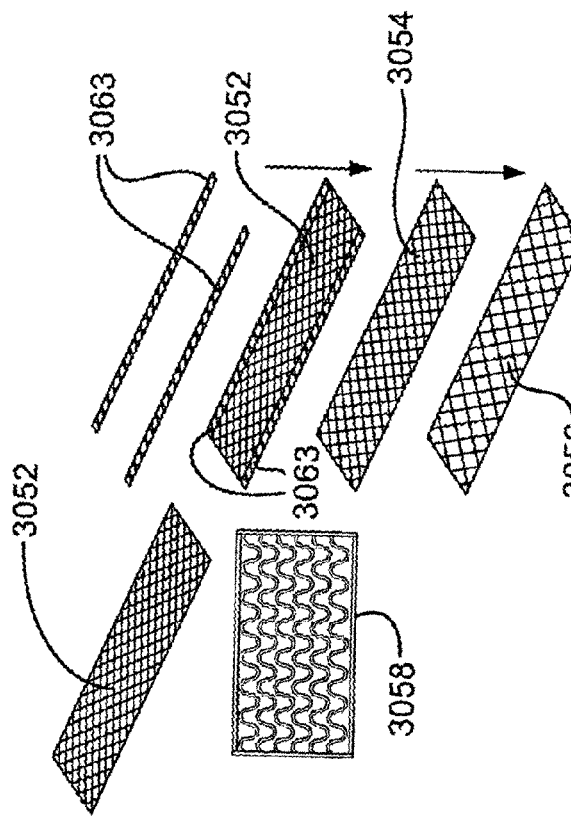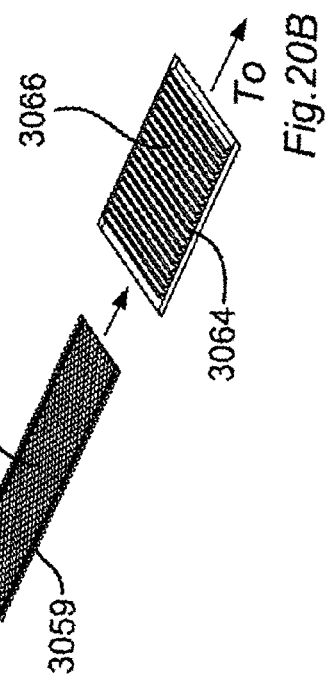

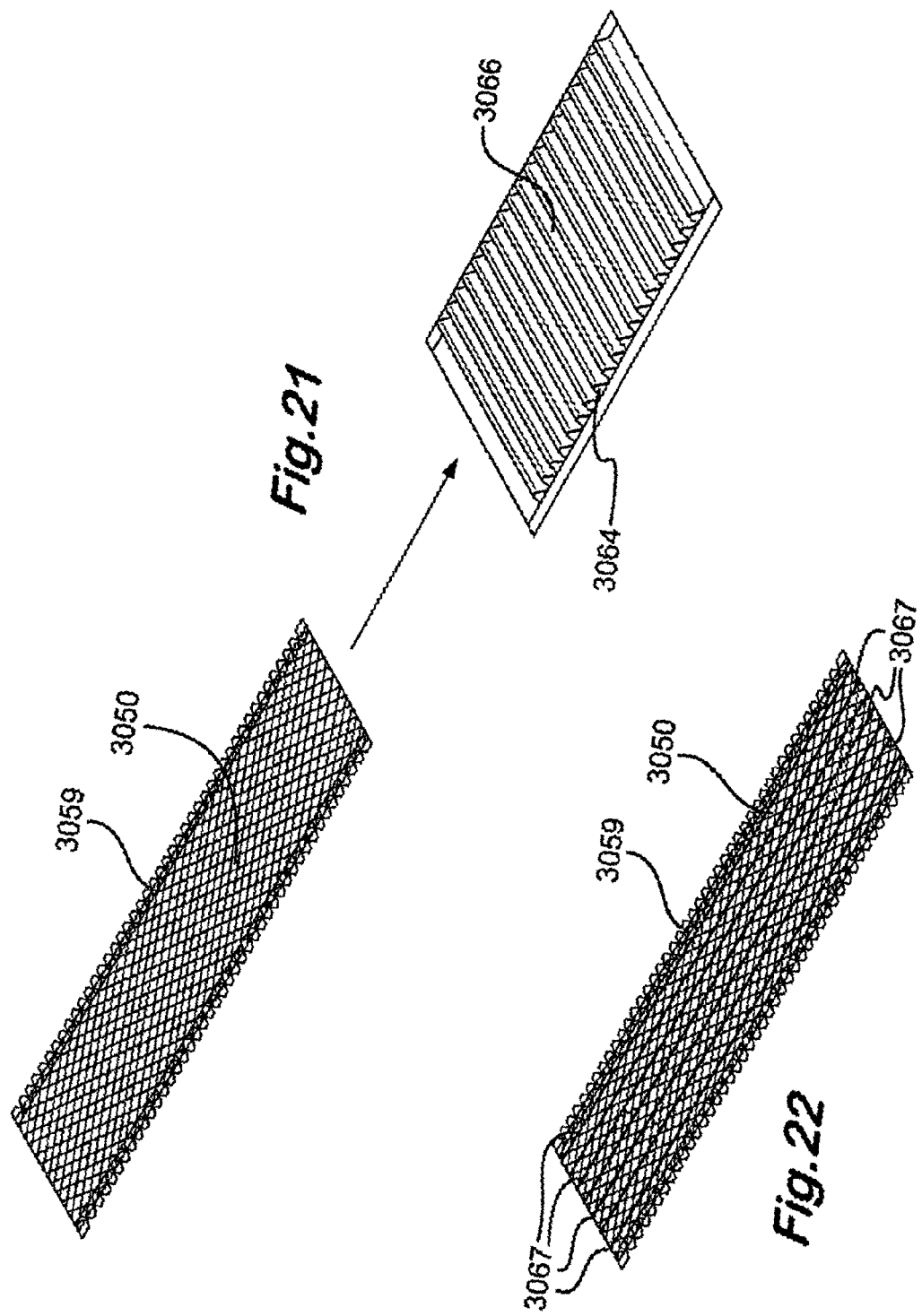

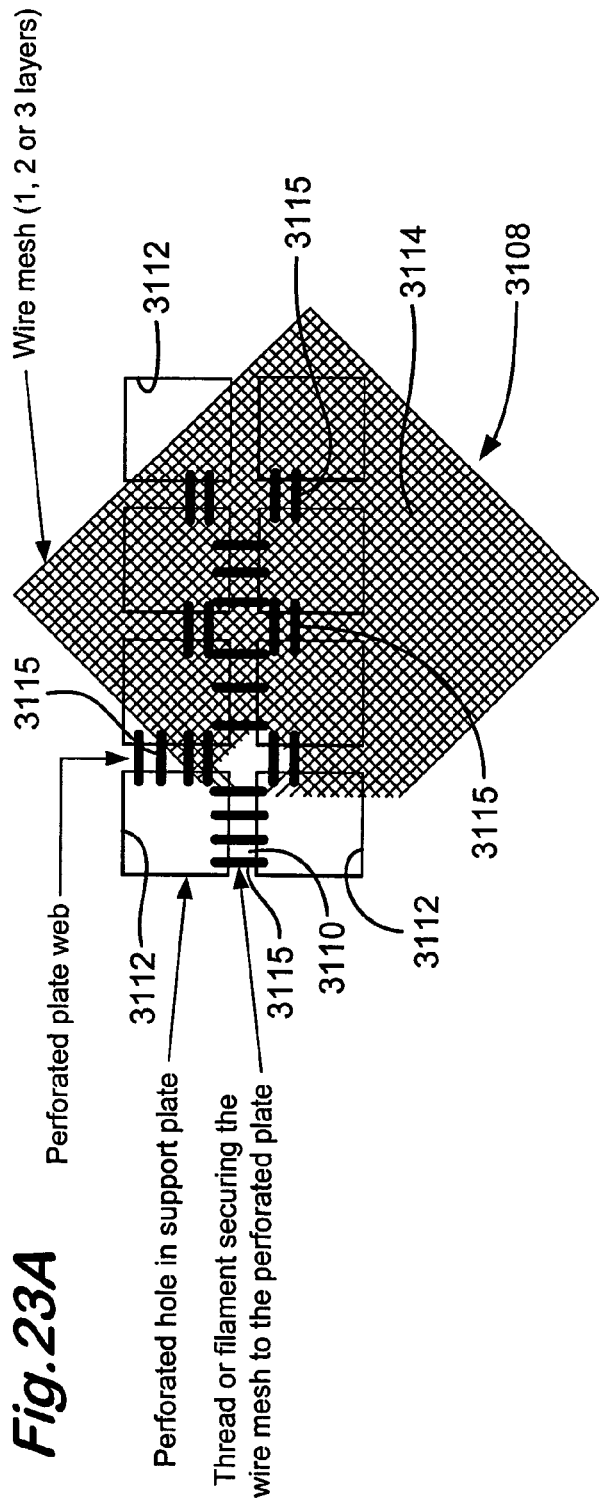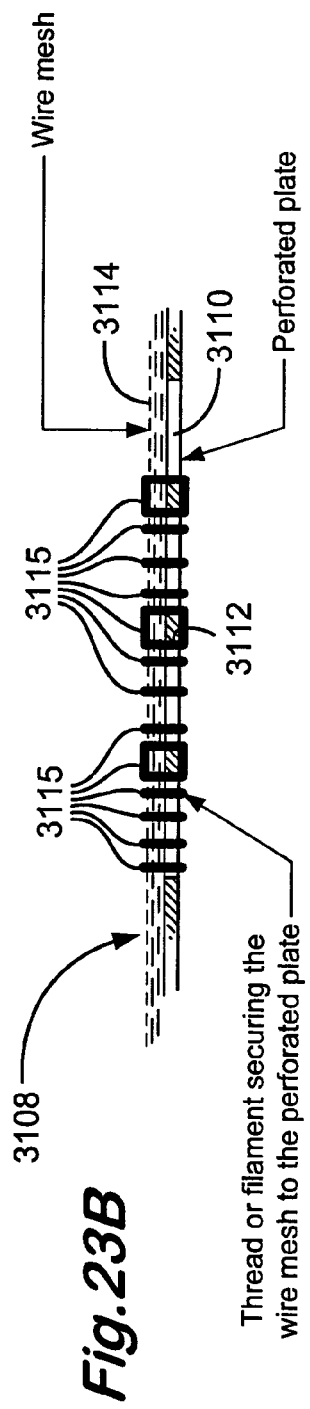

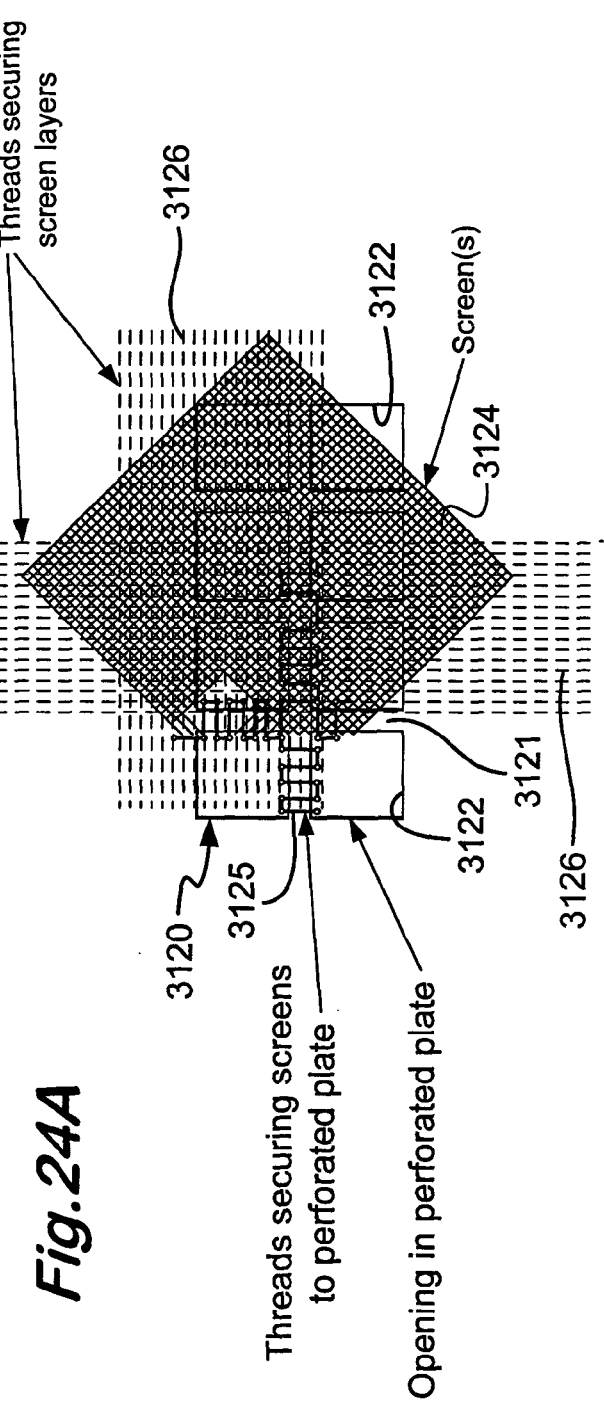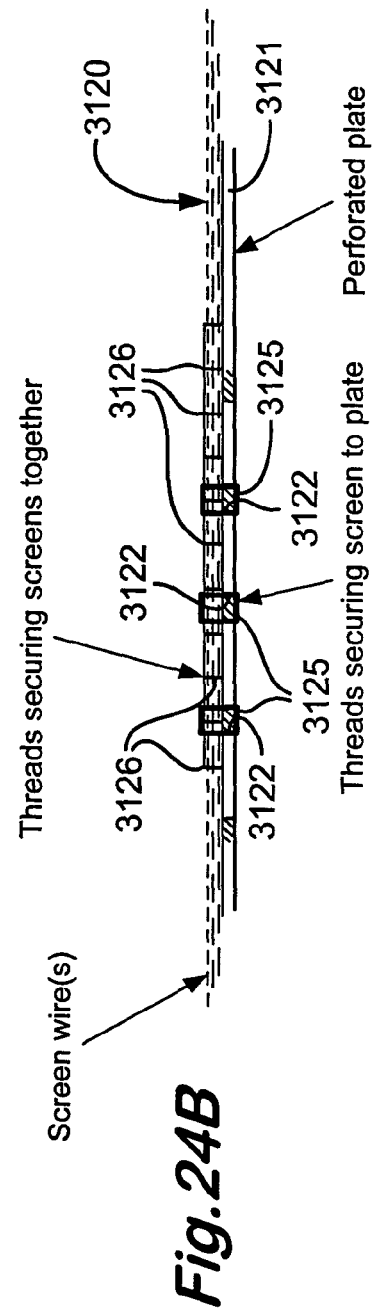

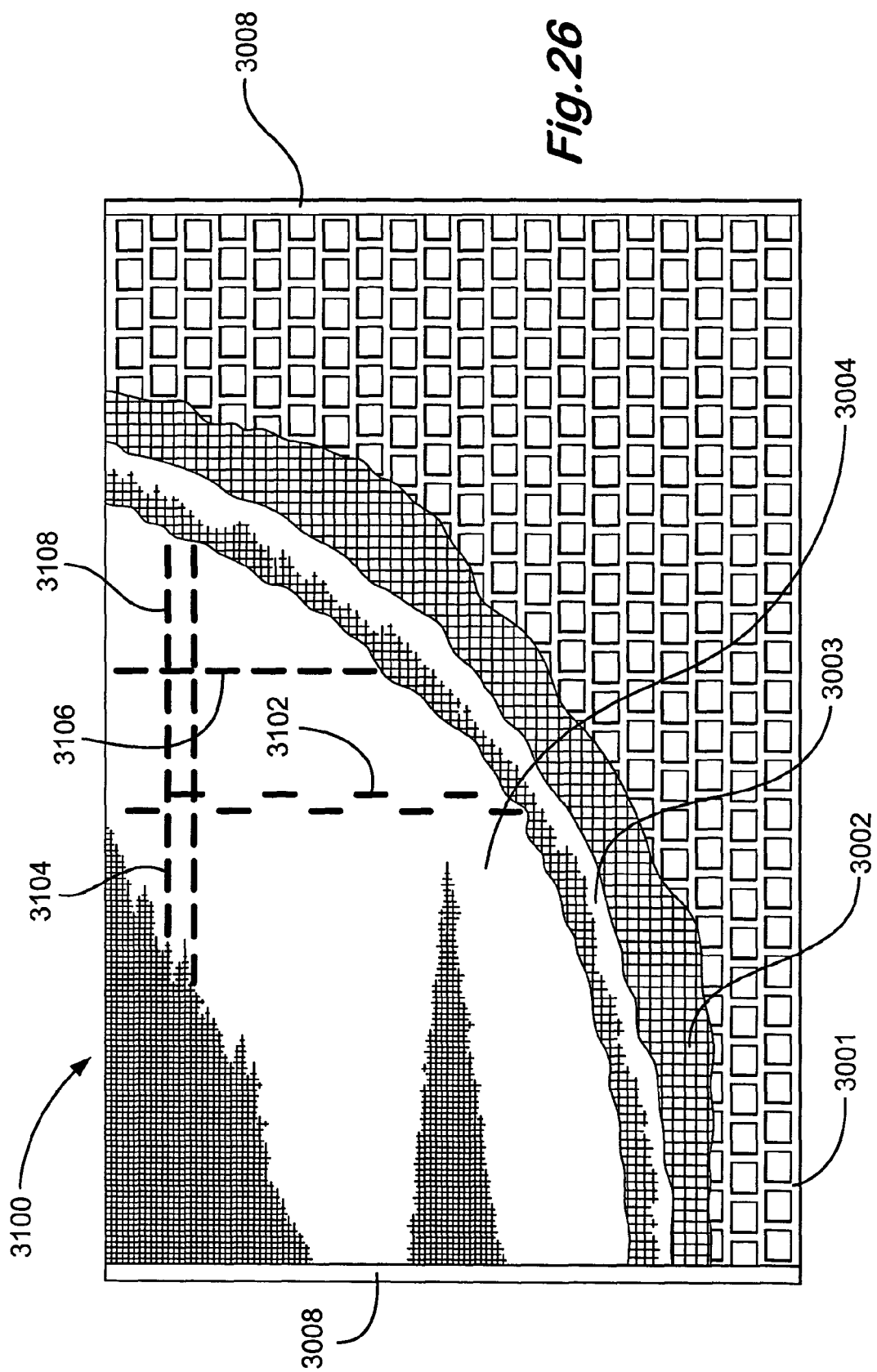

VIBRATORY SEPARATOR SCREENS

RELATED APPLICATIONS

This application is a division of U.S. application Ser. No. 10/236,050 filed Sep. 5, 2002 now abandoned, which is a continuation-in-part of U.S. application Ser. No. 10/210,891 filed Jul. 31, 2002, now U.S. Pat. No. 6,932,883 which is a continuation-in-part of U.S. application Ser. No. 10/037,474 filed Oct. 19, 2001 now U.S. Pat. No. 6,669,985, which is a continuation-in-part of U.S. application Ser. No. 09/603,531 filed Jun. 27, 2000 now U.S. Pat. No. 6,450,345 which is a continuation-in-part of U.S. application Ser. No. 09/517,212 filed Mar. 2, 2000 now U.S. Pat. No. 6,656,698 which is a continuation-in-part of U.S. application Ser. No. 09/454,722 filed on Dec. 4, 1999, now abandoned which is a continuation-in-part of U.S. application Ser. No. 09/390,231 filed Sep. 3, 1999 now U.S. Pat. No. 6,325,216; and this application is a continuation-in-part of U.S. application Ser. No. 09/707,277 filed Nov. 6, 2000 (issued as U.S. Pat. No. 6,581,781 B1 on Jun. 24, 2003) which is a continuation-in-part of U.S. application Ser. No. 09/183,004 filed Oct. 30, 1998 issued as U.S. Pat. No. 6,186,337 on Feb. 13, 2001—all of which applications and patents are incorporated herein in their entirety for all purposes and with respect to all of which the present invention claims priority under the Patent Laws.

BACKGROUND OF THE INVENTION

1. Field of the Invention

The present invention is directed to sewn-together screen assemblies for vibratory separator apparatuses and shale shakers; to methods for making such screens; and to vibratory separator apparatuses and shale shakers with such screens.

2. Description of Related Art

The prior art discloses a wide variety of vibrating screens, devices which use the, shale shakers, and screens for shale shakers. The screens catch, filter, or remove solids from fluid to be treated by a vibratory separator or shale shaker.

Certain prior art screens and screen assemblies for vibratory separators and shale shakers have areas of screening material which are improperly tensioned, including but not limited to, screen assemblies with areas of screen material surrounded by epoxy. With certain such screens, these areas of screening material are often rippled, or wavy, i.e., it is not flat and not, therefore, properly tensioned or not optimally tensioned. A variety of problems and disadvantages are associated with such screens that have areas of rippled screening material: poor conveyance of solids across a screen; reduced screen life; and increased screen cost.

SUMMARY OF THE PRESENT INVENTION

The present invention discloses, in certain embodiments, a screen assembly for a shale shaker for treating drilling fluid with solids therein, the shale shaker having a basket for holding a screen assembly, a vibratory device for vibrating the basket and the screen assembly, and a lower receptacle for receiving drilling fluid passing through the screen assembly, the screen assembly having at least two screening members, each screening member having a surface area, the screen assembly having a top, the at least two screening members connected by sewing material, the screen assembly mountable on the basket so that solids separated from the drilling fluid are moved off the top of the screen assembly by motion imparted to the screen assembly by the vibratory device. The present invention discloses methods for making a screen assembly for a vibratory separator, the methods including sewing together at least two layers (e.g., two, three, four or more layers) screening material. The present invention discloses, in at least certain aspects, methods for making a screen assembly for a vibratory separator, the method including gluing together with glue at least two layers of fine screening material, allowing the glue to set, preheating the glued-together at least two layers of fine screening material, placing the thus-preheated at least two layers of fine screening material in a heating apparatus, placing a coarse mesh layer on the at least two layers of screening material on the heating apparatus, placing on the coarse mesh layer a support with heat activated material thereon for adhering the support to the coarse mesh layer, and heating the coarse mesh layer, at least two layers of fine screening material, and the support to adhere the support to the coarse mesh layer and to glue the at least two layers of fine screening material to the coarse mesh layer. In certain aspects the coarse mesh layer has one or more glue lines or glue beads thereon. In certain aspects, the coarse mesh layer is preheated with the layers of fine screening material.

The present invention discloses, in at least certain aspects, methods for making a screen assembly for a vibratory separator or shale shaker, the method including gluing together with glue at least two layers of fine screening material; allowing the glue to set; preheating the glued together at least two layers of fine screening material; placing the thus-preheated at least two layers of fine screening material in a heating apparatus; placing a coarse mesh layer on the at least two layers of screening material on the heating apparatus; placing on the coarse mesh layer a support with heat activated material thereon for adhering the support to the coarse mesh layer; and heating the coarse mesh layer, at least two fine layers of fine screening material, and the support to adhere the support to the coarse mesh layer and to glue the at least two layers of fine screening material to the coarse mesh layer. In some aspects the glue is moisture-curing hot melt glue and the gluing together of the at least two layers of fine screening material glues together the coarse mesh layer and the at least two layers of fine screening material. In one particular aspect additional glue is applied to the coarse mesh layer, e.g. in at least one line on the coarse mesh layer or in a plurality of spaced-apart lines. The line(s) may be straight, curved, zig-zag, patterned, wavy, etc.

The present invention discloses, in at least certain aspects, methods for tightening screening material on screen assemblies for vibratory separators and shale shakers, the methods including applying heated moisture-curing hot melt glue in a glue pattern to layers of screening material useful for screening fluid introduced to a vibratory separator or shale shaker. Following curing of the glue, there are non-flat portions of screening material between cured lines, portions or beads of the glue. The glued-together layers are then epoxied to a tubular frame. Following curing of the epoxy (with the non-flat areas remaining between the cured glue lines), the resulting screen assembly is subjected to vibration while an aqueous fluid such as drilling fluid with drilled cutting thereon or hot water at a temperature higher than the ambient temperature around the vibratory device (separator or shaker) is introduced onto the topmost layer of screening material. Following such vibration and flowing of fluid, the non-flat portions of the screening material are flattened out. The screen assembly can then remain in use on the vibratory device for a desired time period.

The present invention discloses, in certain aspects, a screen assembly with a tubular frame having four tubular frame sides in a generally rectangular configuration with one crossmember or a plurality of spaced-apart crossmembers extending between the peripheral tubular frame sides. For effective emplacement of such a screen assembly on a shale shaker whose bed or deck has an upstanding member projecting above the bed or deck (e.g. a commercially available Cobra shale shaker), one or more (as required) of the crossmembers is notched or recessed to accommodate the upstanding member so that the screen assembly can lay flat on the bed or deck. The upstanding member projects into the notch, notches, recess, or recesses rather than abutting an unnotched, unrecessed part of the tubular crossmember and thereby preventing the screen assembly from laying flat on the deck or bed.

The present invention discloses, in at least certain embodiments, methods for tightening non-flat parts of glued together screening material combinations and such glued together screening material combinations, and screen assemblies with such a combination mounted on a tubular frame and secured thereto with epoxy.

The present invention, in certain aspects, discloses a screen assembly with layers glued together by, e.g., heated (then cured) moisture-curing hot melt glue, and methods for producing such glued screen assemblies.

The present invention, in one embodiment includes a shale shaker with a frame; a "basket" or screen mounting apparatus; one or more screens according to the present invention as described above and below; and basket vibrating apparatus.

The present invention discloses, in certain aspects, a screen made by methods for making screens and screen assemblies as disclosed herein for a vibratory separator.

What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide:

New, useful, unique, efficient, nonobvious methods for making screen assemblies for vibratory separators, screen assemblies made by such methods, and methods for using such screen assemblies; and, in certain aspects, such screen assemblies with two sewn-together layers of screening material and a coarse layer of screening material;

New, useful, unique, efficient, non-obvious sewn-together screen assemblies for vibratory separators and shale shakers; and Methods for making such screen assemblies.

Certain embodiments of this invention are not limited to any particular individual feature disclosed here, but include combinations of them distinguished from the prior art with their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a basis or creative impetus for designing other structures, methods and systems for carrying out and practicing the present invention. The claims of this invention should be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art familiar with the scope of the art and who has the benefits of this invention's realizations, teachings, embodiments, disclosures, and suggestions, other purposes and advantages will be appreciated from the following description of certain and of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIGS. 1A and 1B are cross-section views of a screen assembly according to the present invention.

FIG. 3 is a cross-section view of a glue bead for screening material combinations according to the present invention.

FIG. 4C is an end view of one end of the screen assembly of FIG. 4A (and the opposing end is identical to that of FIG. 4C). FIG. 4D is a side view of one side of the screen assembly of FIG. 4A (and the opposing side is identical to that of FIG. 4C).

FIG. 7A is a side view and FIG. 7B is a front view of a heating apparatus.

FIG. 9 is a top view of a screen assembly according to the present invention.

FIG. 21 is a schematic view showing a method according to the present invention for making screen assemblies according to the present invention.

FIG. 22 is a perspective view of a screen assembly according to the present invention.

FIG. 23A is a top schematic view of part of a screen assembly according to the present invention. FIG. 23B is a side view of the screen assembly of FIG. 23A.

FIG. 24A is a top schematic view of part of a screen assembly according to the present invention. FIG. 24B is a side view of the screen assembly of FIG. 24A.

FIG. 26 is a top view of a screen assembly according to the present invention.

DESCRIPTION OF EMBODIMENTS PREFERRED AT THE TIME OF FILING FOR THIS PATENT

FIG. 1A shows a glued-together screen combination 10 with lower coarse mesh 11 and upper fine mesh or meshes 12. Following the gluing operation and curing of the glue 131, portions of the upper mesh or meshes are rippled, wavy, or non-flat (as shown). Following mounting (by epoxy powder or by hot melt glue) of such a screen combination 10 to a tubular frame and then subjecting the resulting screen assembly to vibration on a vibratory shaker while fluid at a temperature above ambient temperature (e.g. at least five to twenty degrees hotter than ambient and including, but not limited to drilling fluids from a wellbore up to 160° F. or higher) is fed to the screen assembly, the non-flat portions of the screening material tighten and flatten, as shown in FIG. 1B.

FIG. 3 shows a cross-section or one glue bead's B profile applied to a screen S. The distance "a" is, in this embodiment, about one-sixteenth of an inch but may be any desired height as applied. Preferably the distance "b" is as thin as possible. Alternatively, the raised portion (all above the level "b") is deleted.

Figure 2A:
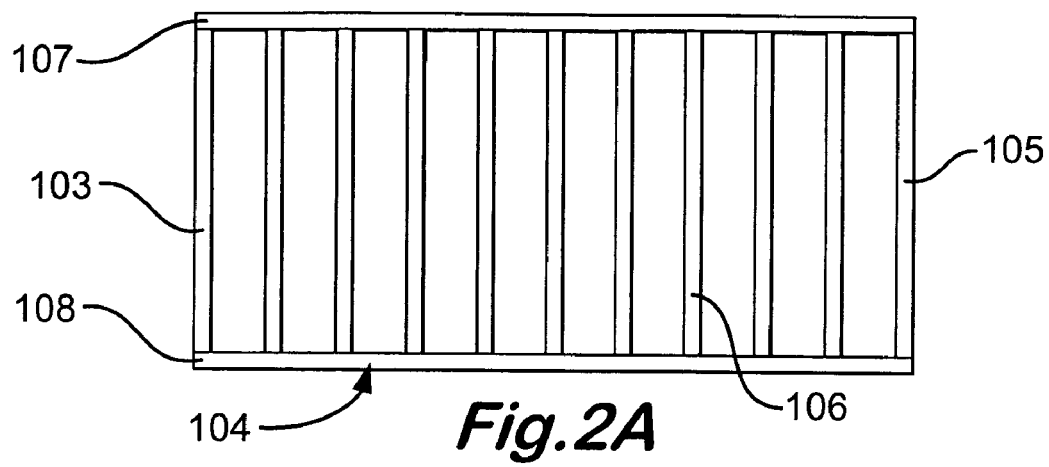
FIG. 2A is a top view of a frame for a screening assembly according to the present invention.
Figure 2B:
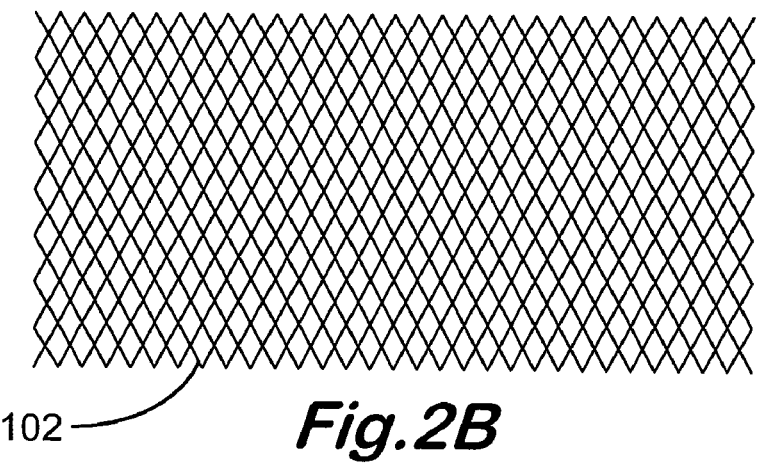
FIG. 2B is a top view of screening material for a screen according to the present invention.
Figure 2C:
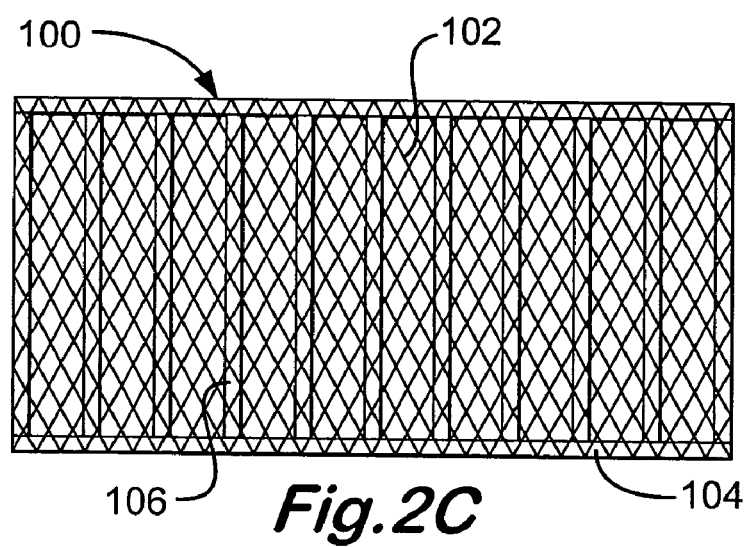
FIG. 2C is a top view of a screen assembly according to the present invention with a frame as in FIG. 2A and screening material as in FIG. 2B.

FIG. 2C shows a screen assembly 100 according to the present invention which has screening material 102 (FIG. 2B) secured onto a tubular frame 104 (FIG. 2A). In other aspects the frame 104 is deleted and a hookstrip (of any known shape and/or configuration) is connected to each of two spaced-apart sides of the screening material 102. The screening material is any multi-layer screen according to the present invention with two, three or more layers glued together as described herein with moisture curing hot melt glue according to the present invention. The multiple layers of glued together screening material 102 and the tubular frame 104 are encapsulated with a powdered epoxy in a semi-cured state and then the semi-cured powdered epoxy is heated, bonding the screening material to the frame 104. Following cooling, the cured powdered epoxy encapsulates the screen material, adjacent to the frame and the frame forming a unitary structure.

The tubular frame 104 has a plurality of crossmembers 106 that extend between and whose ends are connected to sides 107, 108 of the frame 104. End members 103, 105 are at the ends of the frame 104. In certain aspects there are nine crossmembers 106. The tubular frame 104 and its parts may be made of hollow or solids beams, tubes, bars, or rods of metal (e.g. steel, aluminum, zinc, stainless steel and/or alloys of any of these), plastic, or fiberglass. Metal and/or plastic parts may be welded together.

In one particular aspect the frame 104 is made of hollow square cross-section tubes 103, 104, 107, 108 with a 0.766 inch square cross-section and round cross-section tubes 106 with a 0.601 square inch cross-section. The screen assembly 100 (and the frame 104) may have any suitable desired length and width. In one aspect the screening material is made of strands of 304, or 316 stainless steel and the frame is made of carbon steel. In another aspect the crossmembers 106 and/or end members 103, 105 are made of tubular members with a circular, oval, or elliptical cross-section.

In one aspect the screening material is bonded to the frame with a powdered epoxy material. The frame is heated then dipped into a fluidized bed of the powder which completely encapsulates the frame in a semi-cured state and, in one particular aspect, with a thickness of about 35 mils. The frame and screening material are put on a heated platen with the screening material (in one case three layers 170×105 mesh, 105×64 mesh and 19 mesh glued together with a method according to the present invention) below the frame. Upon heating to about 450 degrees F., the powdered adhesive is heated and flows down over the wires of the screening material. In one aspect the wires are partially coated and in another they are, preferably, completely encapsulated with the adhesive. The frame with the screening material on it is left on the heated platen until the coating is cured, being heated when it is curing. In one aspect the coating encapsulates the frame. Any glue bead pattern and application method described in the parent patent applications of this invention may be used according to the present invention.

FIGS. 4A–4F show a screen assembly 40 according to the present invention which has a tubular frame 42 with ends 44 and interconnected sides 45. A screening material combination 50 is bonded with epoxy powder to the tubular frame 42. A crossmember 41 (of a plurality of spaced-apart crossmembers 43 that extend between and have ends connected to the sides 45) has two notches 46 for receiving an upstanding member of a shale shaker deck.

In certain shale shakers in which screen assemblies without crossmembers such as the crossmember 41 are used, one or more upstanding members are used for proper screen assembly positioning or for stabilizing screen assemblies in position. Rather than removing such upstanding member(s), a screen assembly according to the present invention may be installed on such a shaker deck so that the upstanding member (which is perpendicular to the crossmember 41 as viewed from above or below) is received in and projects into one (or more) of the notches 46. With a screen assembly 40 as shown, the crossmembers 43 on either side of the crossmember 41 are sufficiently spaced-apart from the crossmember 41 that the upstanding member does not contact the adjacent crossmembers 43. Although only one notch 46 can accommodate an upstanding member, by using two notches 46, proper emplacement of the screen assembly 40 over the upstanding member is made "fool proof"—i.e. whichever side of the screen assembly is placed nearest the shaker's exit end (or fluid introduction end) one of the notches will be above the upstanding member. Of course it is within the scope of the present invention to place aligned notches on adjacent crossmembers to accommodate an upstanding member of length sufficient to extend beyond the distance separating two, three, four or more.

The screen assembly 40 as shown has a multi-layer combination 50 of layers of screening material glued together with moisture curing hot melt glue in a glue pattern 62. The multi-layer glued-together combination 60 is bonded to the tubular frame 42 with cured epoxy powder. As shown the screen assembly 40 has not yet been vibrated with fluid flowing onto it and areas 64 of screening material between glue lines is non-flat or rippled (as shown). Subjecting the screen assembly 40 to vibration and fluid flow according to the present invention will result, according to the present invention, in the tightening of the non-flat screening material in the areas 64.

Figure 4A:
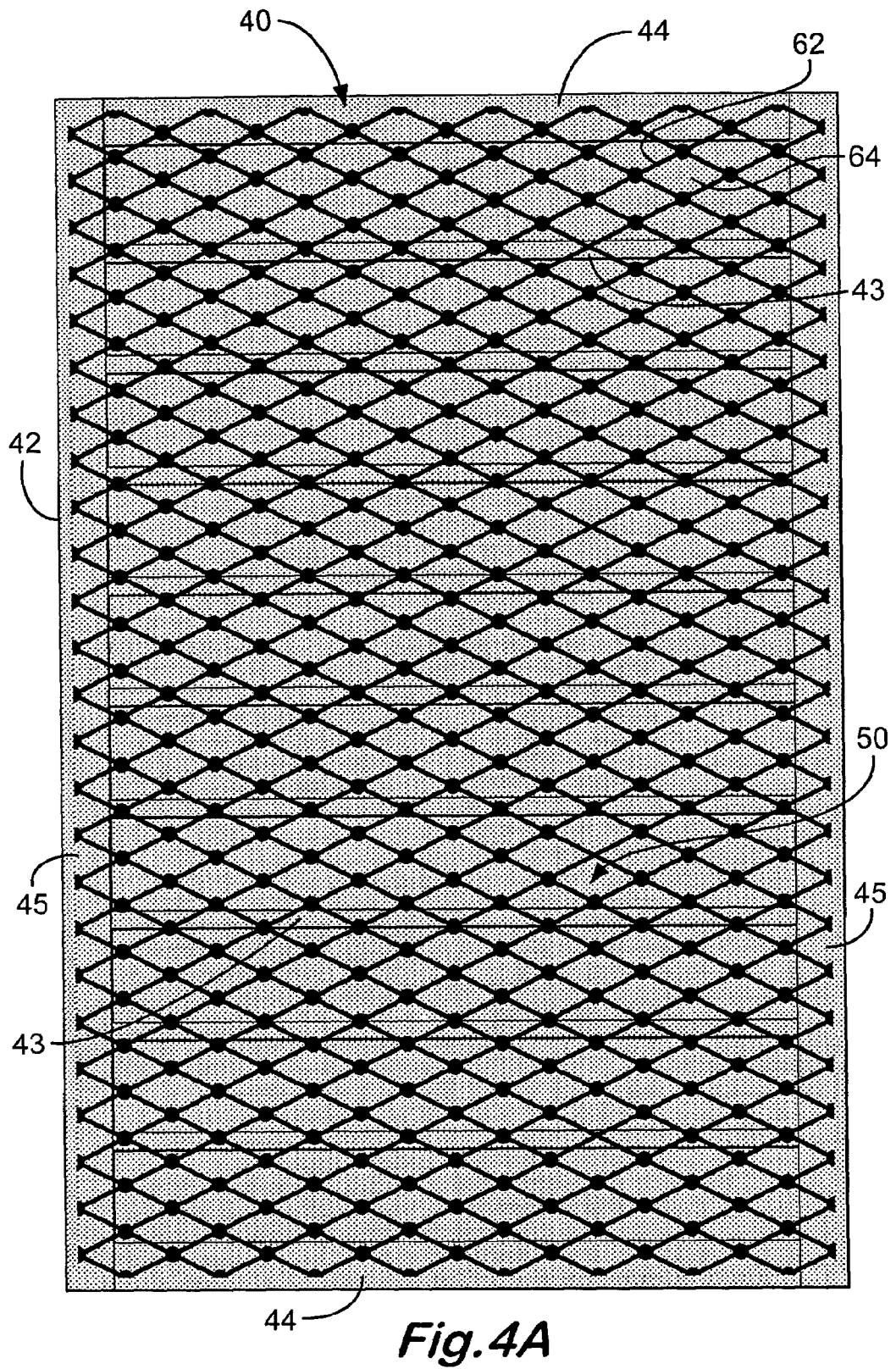
FIG. 4A is a top view of a screen assembly according to the present invention.
Figure 4B:
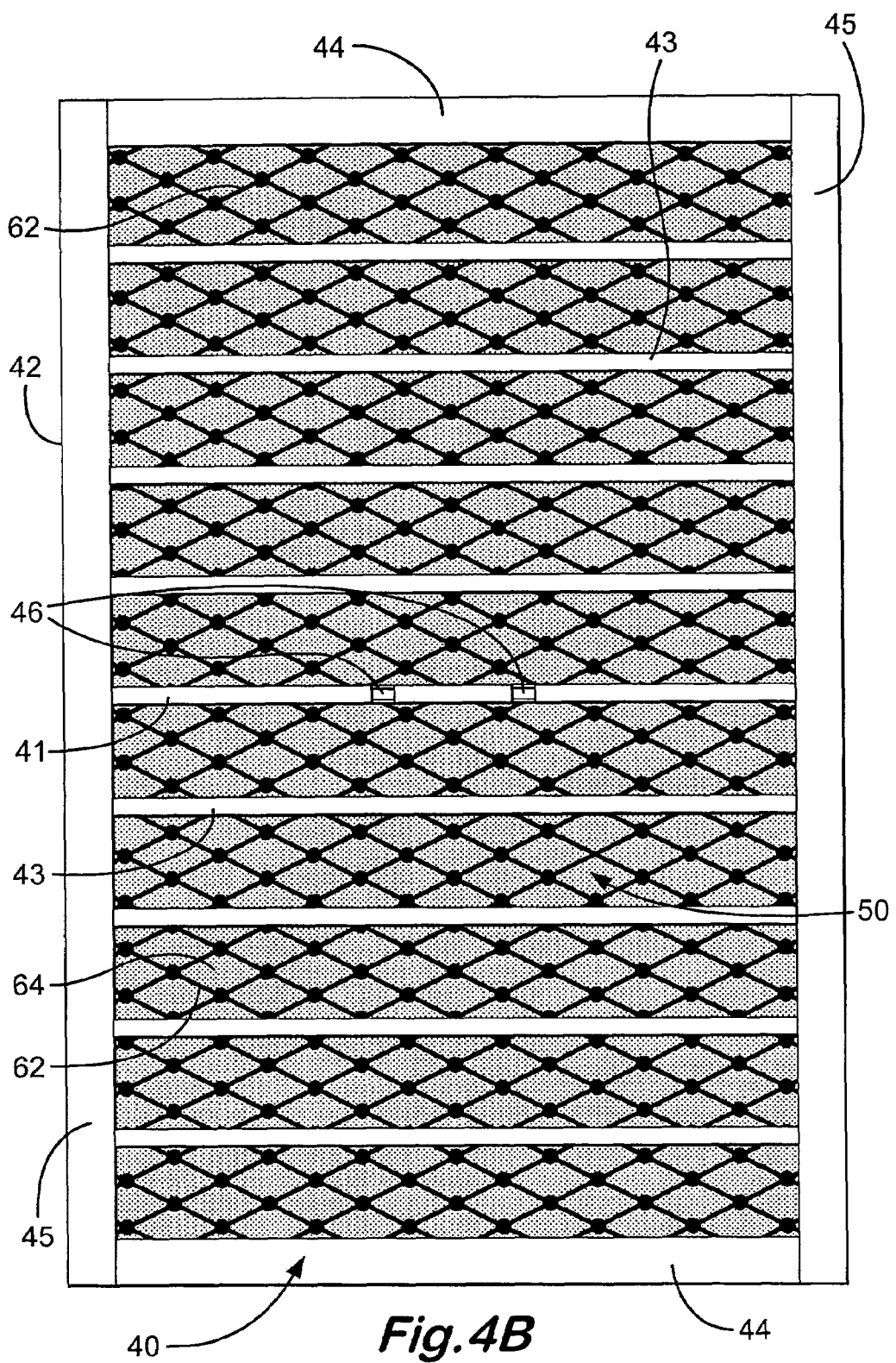
FIG. 4B is a bottom view of the screen assembly of FIG. 4A.
Figure 4E:
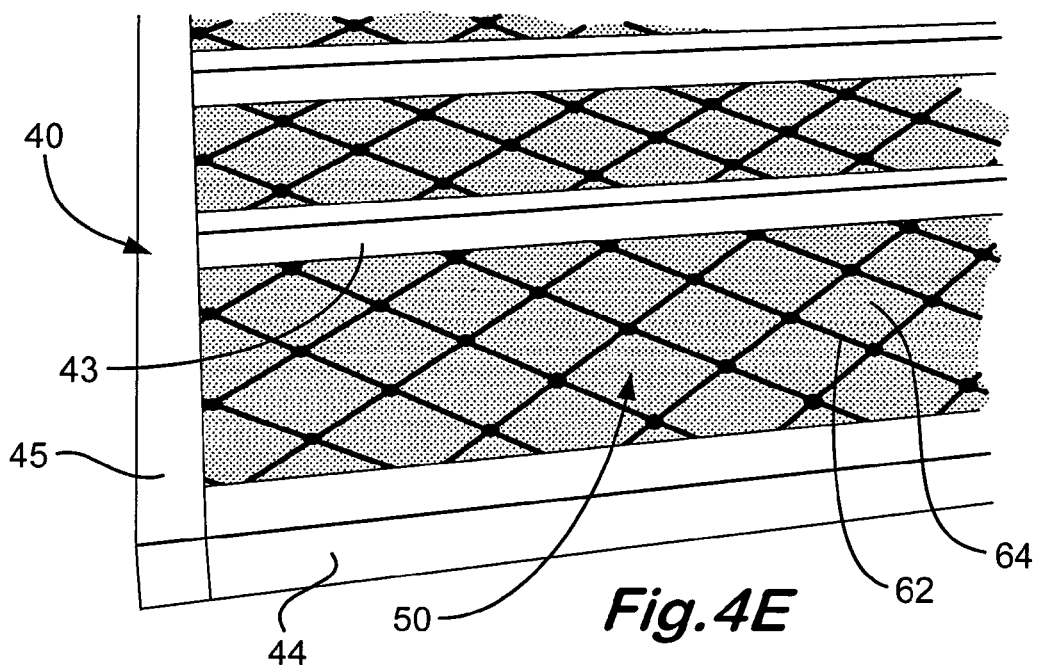
FIG. 4E is a partial bottom perspective view of the screen assembly of 4A.
Figure 4F:
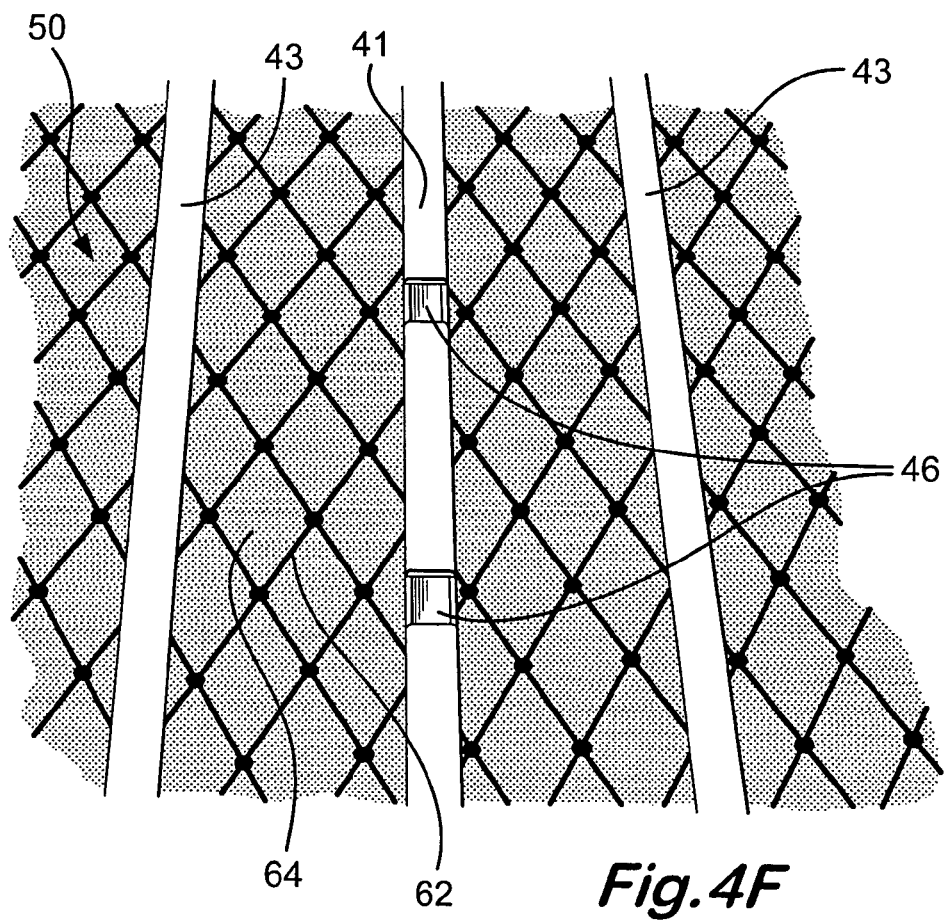
FIG. 4F is a partial bottom view of the screen assembly of FIG. 4A.

It is within the scope of the present invention to provide a screen assembly with a support for glued-together combination of multiple layers of screening material (e.g. any glued-together multi-layer combination disclosed herein or in parent patent applications of this invention) that is a perforated plate (instead of the tubular frame, e.g. instead of the tubular frame 14, FIG. 1B; the tubular frame 42, FIG. 4A; or the tubular frame 104, FIG. 2A). Any known perforated plate may be used. Such a screen assembly with a perforated plate is within the scope of the present invention with or without non-flat screening areas; and such a screen assembly may have spaced-apart side hookstrips for mounting in a shale shaker.

Tightening of non-flat screening areas (e.g. as in the screen assemblies of FIGS. 1A, 2A and 4A) may, according to the present invention, be facilitated by flowing fluid onto the screen assemblies that is above ambient temperature. In certain aspects the fluid temperature is between five degrees to twenty degrees above ambient temperature. Such a temperature may be achieved using any known heater apparatus and/or by pumping fluid, e.g., but not limited to, pumping fluid with the typical known fluid pumping apparatus associated with known shale shakers. In other aspects, when the fluid pumped onto the screen assemblies is drilling fluid from a wellbore being drilled, the drilling fluid having drilled cuttings, etc. therein, the fluid temperature may be between 120° F. and 160° F. or higher.

In one particular embodiment a screen assembly as in FIG. 4A was run on two commercially available King Cobra shale shakers for a total of about 96 hours with 16 pound oil-based drilling fluid with drilled cuttings and shale solids therein being treated by the screen assembly. Following this use the screening material areas which were non-flat were tightened. In another embodiment, a screen assembly as in FIG. 4A was run on a King Cobra shaker for 120 hours and fluid slightly above ambient temperature (e.g. four to twelve degrees F. above ambient) was fed to the screen assembly, the fluid weighing about nine pounds per gallon and containing sand, water, and bentonite (by weight, about 92% water, 4% sand and 4% bentonite). Following this use screening material areas that were non-flat were tightened.

It is within the scope of this invention to tighten non-flat screening material areas between glue lines of a multi-layer screening material combination of a screen assembly by vibrating the screen assembly for a sufficient time period on a shale shaker while feeding fluid thereto at a sufficiently high temperature to effect tightening of the non-flat areas. Such fluid may or may not contain drilled cuttings, sand, and/or other solids.

In one method according to the present invention a combination of two layers of screening material is sewn together by any sewing method or technique described herein with any stitch or stitch pattern described herein. In one aspect, the two layers range between 30 and 250 mesh; in one aspect one layer is between 30 and 200 mesh and the other layer is between 50 and 300 mesh; and in one particular aspect one layer is 160 mesh and the other is 180 mesh—both mesh layers of stainless steel wire. The two-layered combination is placed on the bottom base of a heated platen and a layer of coarse mesh (e.g. between 18 to 30 mesh and in one aspect 20 mesh) is placed on top of them. A frame (or plate) previously coated with adhesive material, e.g. but not limited to, powdered epoxy material, is then placed on top of the coarse mesh. One or more lines of glue are on the coarse mesh layer (lengthwise, widthwise, curved and/or in any known pattern or spacing). The heated platen's top member is then lowered down onto the frame. By heating these components in this manner, the two fine screening mesh layers are glued together and the frame (or support) is adhered to the mesh layers. All three mesh layers are bonded together at points where they are contacted by the epoxy material. Preferably, at least some of the wires of the coarse mesh layer and/or of the two screening material layers are encapsulated in the adhesive. Optionally, the two layers of screening material and the coarse mesh layer with one or more glue lines are all three preheated together and joined together and then the frame is joined to the three layers.

Any suitable glue (in one aspect, a heat activated glue that is quick curing), epoxy, or adhesive (although these are not equivalents of each other) may be used to adhere the frame to the mesh layers. The frame (or support) may be adhered over substantially all its area to the coarse mesh layer and there may also be adherence to one or both of the other screening material layers depending on the epoxy, glue or adhesive used and on its amount. In one particular aspect the frame (or support) is heated and then coated (e.g. in a fluidized bed or with a spray system) with epoxy powder as described herein (or according to any method for such coating as is well known in the prior art) and the epoxy powder is only partially or semi-cured. Any suitable epoxy material known in the prior art may be used. In one particular aspect one, two, three, four or more glue beads (any disclosed herein) are applied lengthwise and/or across the width of the coarse mesh layer (e.g. in any pattern and by any glue machine or glue apparatus according to the present invention, disclosed herein, or referred to herein) prior to its imposition on top of the two sewn-together mesh layers.

In those embodiments in which a three layered screen panel—lowermost coarse mesh beneath two fine mesh layers—is preheated prior to its connection to a frame, plate, or support, wires of the two fine meshes expand and elongate more than the wires of the coarse mesh layer. For example, with a top mesh layer of 180 mesh made of wire 0.0012" in diameter; a middle mesh layer of 160 mesh with wire of 0.0014" diameter; and a coarse mesh layer of 20 mesh with wires of 0.0065" diameter, the finer mesh wires elongate more and more quickly than do the wires of the coarse mesh layer. Thus it is preferred for such an embodiment that the pre-heat time (prior to imposition of a frame, etc.) be sufficient to allow the wires of the coarse mesh to elongate to the same extent as the wires of the fine meshes. Optionally, following imposition of the epoxy-coated frame on the coarse mesh layer, the cure of the epoxy can be accelerated (e.g. with cure accelerator materials and/or by mechanical cooling apparatus) to prevent the coarse mesh wires from returning to their original size. If the cure is not rapid enough, quick contraction of the coarse mesh wires can crack the epoxy and result in a loss of desired tension in the finer meshes. In one aspect the wire diameter of the coarse mesh wires is at least three times that of the wire diameter of the fine mesh wires and in one particular aspect at least four times.

Also, the present inventors have found that the addition of adhesive promoter materials and/or particles of color pigment (e.g. red pigmentation material) to epoxy material to produce a hardened epoxy bond on a frame, support, or screen assembly, can result in undesirable cracking and non-uniform curing of the epoxy material. Preheating a combination of screen layers and a support together can also result in undesirable cracking. Such cracking and non-uniformity is reduced by using a method as described above in which a frame with epoxy material in a semi-cured state is placed with layers of screening material and then these components are heated as described, e.g. in a heated platen apparatus. In one particular aspect of such a method to produce such a screen assembly, a two layer screen combination with a layer of 160 mesh and a layer of 180 mesh, both stainless steel wire meshes, is produced by sewing the two layers together according to the present invention with a stitch pattern according to the present invention, including, but not limited to, with a lock stitch. A layer of coarse mesh (20 mesh, stainless steel) with one, two or more lengthwise glue beads (in one aspect, four equally spaced-apart glue beads from one side to the other, straight or in a curved shape as viewed from above; and in one aspect a plurality of glue beads about 3$\frac{1}{16}$" apart or about 1$\frac{11}{32}$" apart) (produced by a glue machine according to the present invention) is placed on top of the two finer mesh layers in a heated platen and a tubular frame made of carbon steel with four sides and a plurality of crossbars (e.g., but not limited to, nine spaced-apart) is placed on top of the coarse mesh, the tubular frame coated with semi-cured epoxy material, e.g., but not limited to as described in U.S. Pat. Nos. 6,267,247; 6,290,068; and 5,876,552, all incorporated fully herein for all purposes. The platen is closed and the components are heated at about 450° F. for about 10 to 18 minutes. The resulting screen assembly is removed from the platen and allowed to cool. Optionally, only one fine mesh layer is used. Optionally, heating and/or preheating for any step of any method herein can be accomplished in an oven. Optionally, the coarse mesh layer is first joined to the two layers of screening material and then the resulting three layer combination is joined to a frame or support. 59. FIGS. 7A and 7B show a heated platen apparatus for use in methods described above with an upper movable heatable member 91 and a tray, bed or support 92 on which screen assembly layers and frame (or plate) are positioned. The member 92 is movable by a moving apparatus 93 shown schematically in FIGS. 7A and 7B. Alternatively, the tray 92 can be heated with or without heating the member 91.

The glue of the glue lines or beads placed on a lower coarse mesh provides a barrier that prevents the migration of solids across the screen assembly between the coarse mesh layer and the fine mesh layer above the coarse mesh layer. For example, if a hole is made in the upper fine mesh layers permitting solids to flow through them, such solids can move across the screen assembly on top of the coarse mesh layer (beneath the fine mesh layers) causing additional damage. A glue line or bead on the coarse mesh layer acts as a barrier to the movement of such solids. In certain aspects these glue beads are generally oval, circular, or generally semi-oval or semi-circular in cross-section with a diameter or height between $\frac{1}{8}$" and $\frac{3}{16}$". In certain aspects glue in a pattern or series of beads on the two fine mesh layers is between $\frac{1}{16}$" to $\frac{1}{8}$" in height or diameter. In certain aspects after being heated by the platen, the glue beads are flat.

Figure 5:
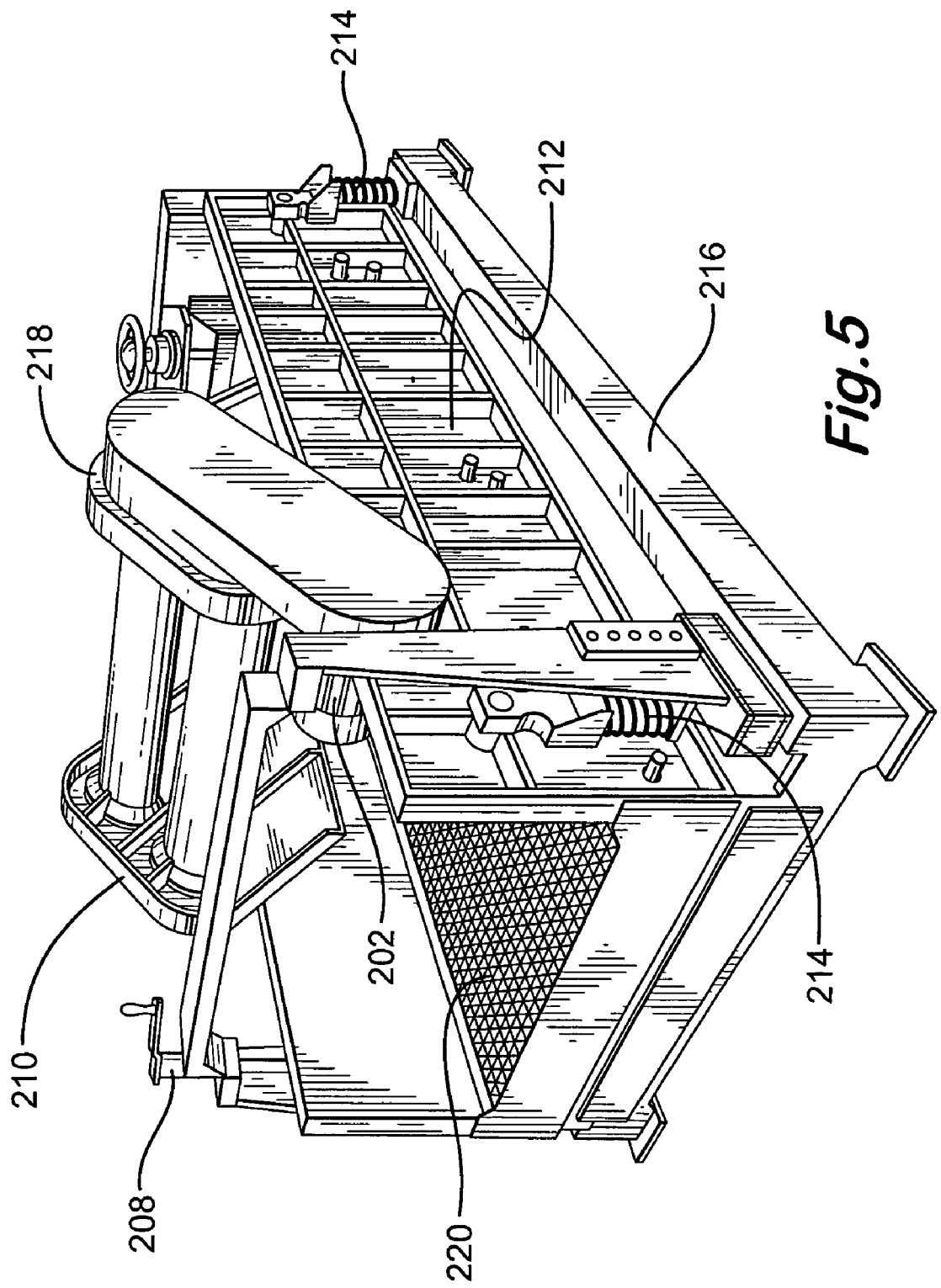
FIG. 5 is a perspective view of a shale shaker according to the present invention.

Referring now to FIG. 5, a shale shaker 210 according to the present invention has a screen assembly 220 (with screen or screening cloth or mesh as desired) according to the present invention mounted on vibratable screen mounting apparatus or "basket" 212. The screen assembly 220 may be any screen assembly disclosed herein or have any combination of any feature or features of any screen, screen assemblies or screen part disclosed herein according to the present invention; and any such screen may be used with any appropriate known shaker or screening apparatus including, but not limited to, a vibratory separator like the shale shaker 210. The basket 212 is mounted on springs 214 (only two shown; two as shown are on the opposite side) which are supported from a frame 216. The basket 212 is vibrated by a motor 202 and interconnected vibrating apparatus 218 which is mounted on the basket 212 for vibrating the basket and the screens. Elevator apparatus 208 provides for raising and lowering of the basket end. The screen assembly 220 may be any screen assembly disclosed herein according to the present invention.

Figure 6:
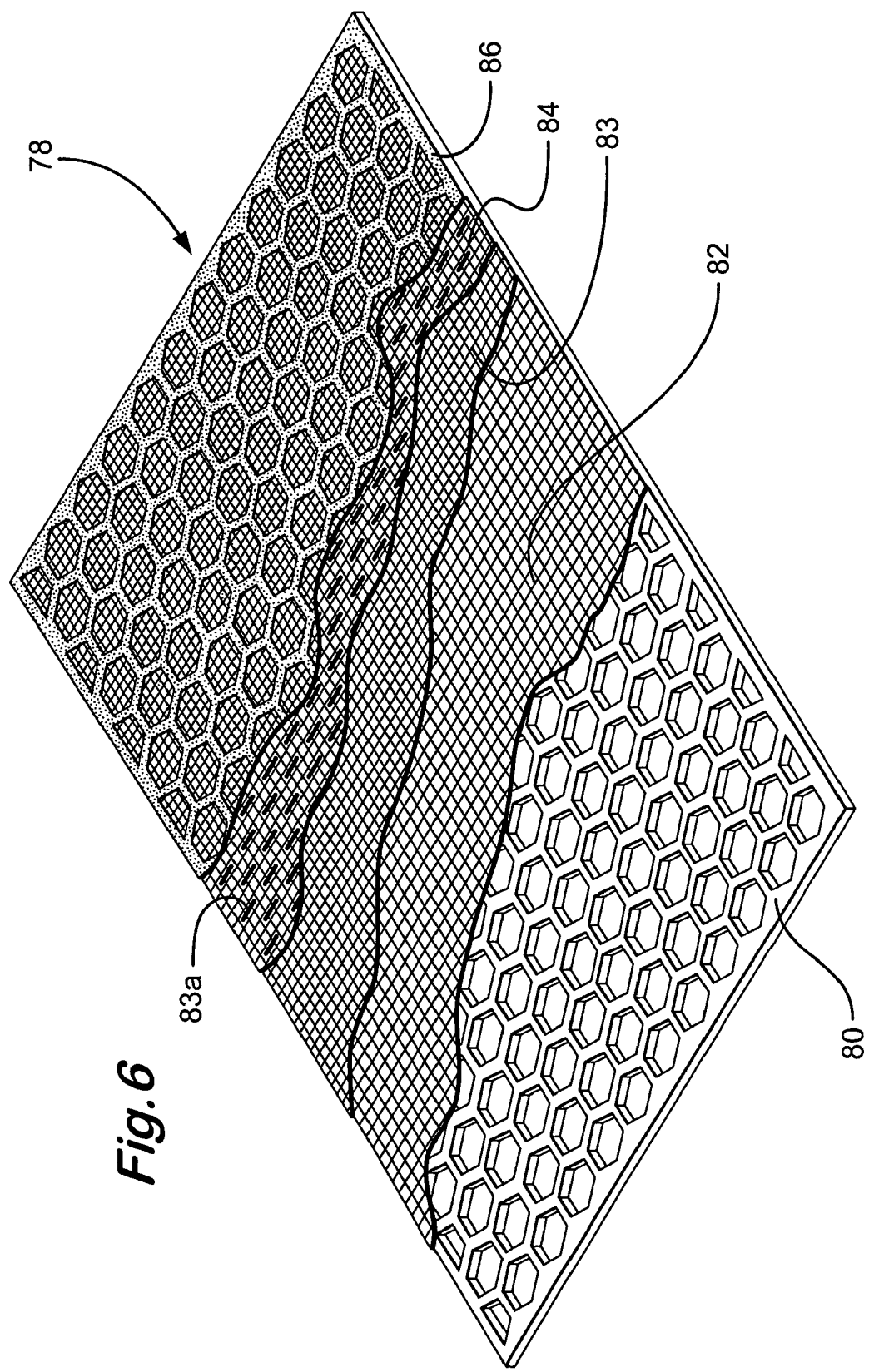
FIG. 6 is a perspective view of a screen assembly according to the present invention.

FIG. 6 shows a screen assembly 78 according to the present invention (shown with various layers partially cut away but which extend across the surface of the screen assembly) made by a method according to the present invention as described above wherein the two upper fine mesh layers are sewn-together screening material layers 83 and 84 sewn together with stitching 83a (which extends over substantially all the surface of the two layers but is only shown partially for purposes of illustration); the coarse mesh layer is layer 82; the support is a perforated plate 80 which is initially coated with epoxy 86 which upon curing, assumes a pattern like that of the openings of the perforated plate 80. Optionally either layer 83 or 84 may be deleted (thereby eliminating the step of sewing two fine mesh layers together).

Figure 8A:
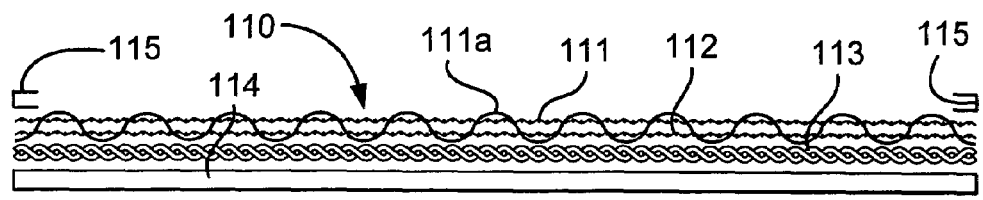
FIG. 8A is an end exploded view of a screen assembly according to the present invention.
Figure 8B:
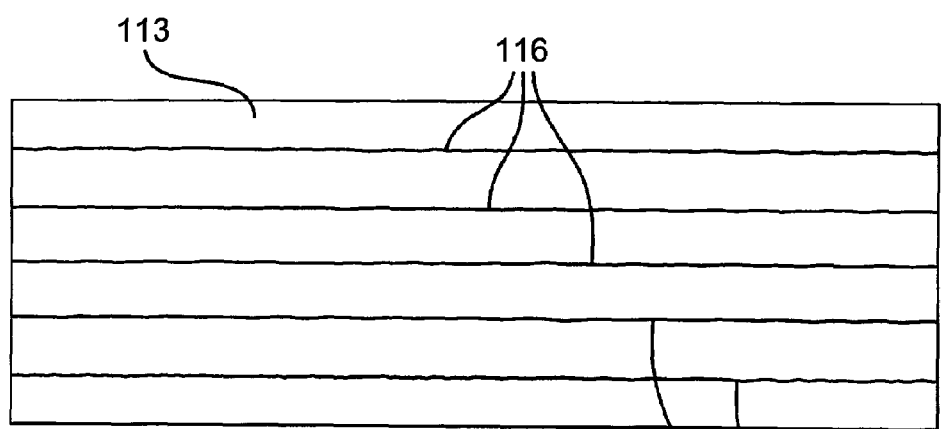
FIG. 8B is a top view of a coarse mesh layer of the screen assembly of FIG. 8A.
Figure 8C:
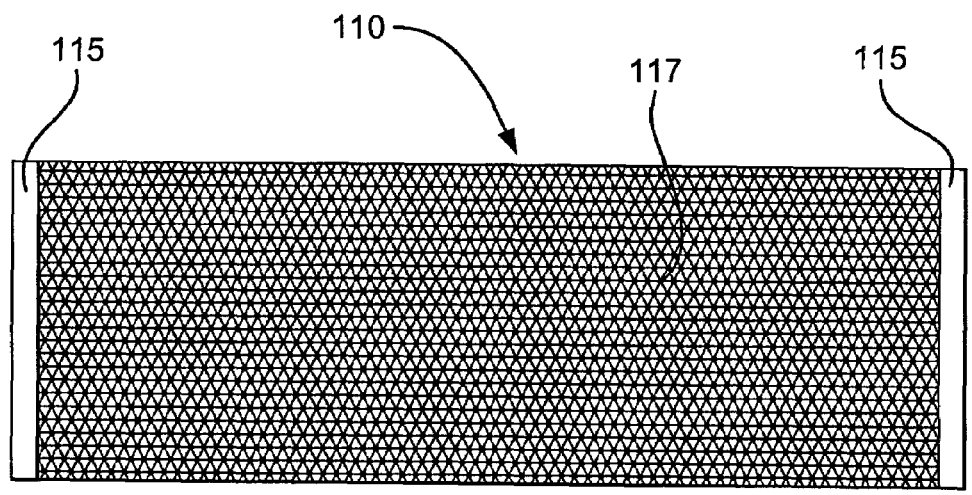
FIG. 8C is a top view of the screen assembly of FIG. 8A.

FIGS. 8A–8C show a screen assembly 110 according to the present invention which has two sewn-together upper screening layers 111, 112 made of fine screening material [sewn by any method described herein, e.g. with thread 111a shown for the purposes of illustration loose and not in a tightened sewn stitch]; a coarse mesh layer of screening material 113; and a perforated plate support 114. Hookstrips 115 extend along opposed sides of the screen assembly 110. The hookstrips 115 are shown as "C" shaped, but it is within the scope of this invention to use any known hookstrip shape or configuration. Any known fine screening mesh and coarse mesh may be used for the layers 111, 112 and 113, respectively, including, but not limited to, those described or referred to above. Any suitable known plate may be used for the plate 114.

FIG. 8B shows a plurality of glue beads 116 extending across the coarse mesh layer 113 (the actual mesh and weave of the coarse mesh layer is not shown in FIG. 8B). Any desired number of beads 116 may be used from one to seven or more. Optionally, the beads extend lengthwise (from top to bottom in FIG. 8B) rather than across the coarse mesh layer. Optionally, a pattern of beads that intersect is used on the coarse mesh layer, including, but not limited to, in any pattern disclosed or referred to herein. Optionally, the plate 114 is deleted. Optionally, the plate 114 and hookstrips 115 are deleted and a frame or strip support is used. Optionally the plate 114 is deleted and a strip support is used.

FIG. 9 shows a screen assembly 3000 with some parts like those of prior art U.S. Pat. No. 4,575,421; however as described below, various parts of the screen assembly 3000 are held together by sewing material (e.g. thread, wire, string, filaments, cord, twine, yard or fiber). U.S. Pat. No. 4,575,421 is incorporated here fully for all purposes, including, but not limited to the parts of the screen assembly 3000 which are like the parts of the screen assemblies in the patent. Sides 3008 may be any known channel-shaped member, hookstrip, or frame sides. Alternatively a rigid frame with four sides may be used.

A plurality of layers of screening material 3002, 3003, and 3004 are positioned above a plate 3001 (like the plates, including but not limited to the plate 11, in U.S. Pat. No. 4,575,421). The layers 3002, 3003 and 3004 are like the layers, respectively, 24, 25, 26 as described in U.S. Pat. No. 4,575,421. It is, however, within the scope of this invention to delete any one or two of the layers and for any of the layers 3002, 3003, 3004 to be any screening material or mesh disclosed herein or combination thereof; and it is within the scope of this invention for the plate 3001 to be any support plate structure screen, frame, or series of strips (although these things are not legal equivalents) known in the art.

Figure 10:
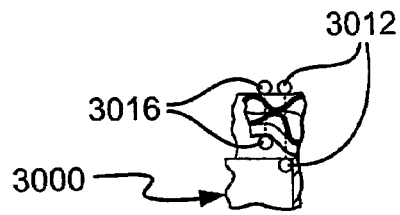
FIGS. 10 and 11 are cross-section views of parts of the screen of FIG. 26.
Figure 11:
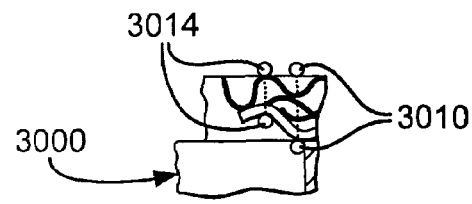

The layers 3002, 3003, 3004 are sewn together by sewing material. Exemplary lines of sewing material 3014 and 3016 are shown in FIGS. 9, 10, and 11. It is to be understood that such lines of sewing material sewing the layers together may extend in spaced-apart fashion over substantially all of the surface of the layers with any desired spacing between lines of sewing material. It is also within the scope of this invention for the sewing material to be in lines that are generally parallel to the sides of the screening layers, as shown; for the sewing material lines to extend diagonally across the screening material; for the sewing material lines to be at an angle other than diagonal across the screening material; and/or for lines of sewing material to intersect, forming any desired pattern including, but not limited to, a pattern corresponding to shapes formed by members of a lower supporting mesh, structure or plate. Such lines of sewing material may also be used to join together either layers 3002 and 3003, 3002 and 3004, and/or layers 3003 and 3004.

Lines of sewing material 3010 and 3012 sew together the plate 3001 and the layers 3002, 3003 and 3004. The lines 3010 and 3012 may take any of the forms and positions described above for the lines 3014, 3016. In one aspect "edge stitching" may be used to sew screening material to the plate. It is also within the scope of this invention to sew one, two, three or more layers of screening material to a frame that supports the screening material.

The sewing material used to sew together any two or more layers of screening material and/or mesh, or any support structure or plate and one or more layers of screening material may be any suitable known sewing material, including, but not limited to, thread, wire, yarn, string, twine, cord, and filament line (any of which may be mono- or multi-strand or filament with different or similar strands or filaments in multi-component sewing material). Such sewing material may be made, e.g., of natural, plastic, or synthetic thread, yarn, cord or wire materials; composite materials; polymer(s); elastomer(s); rubber; phenolic resin(s); metal (including but not limited to steel, stainless steel, bronze, brass, copper, zinc, aluminum and any combination or alloys of them); KEVLAR™ material; and polytetrafluoroethylene or Teflon™ material—any of which may be coated with plastic, metal, polymer, elastomer, or resin. Sewing material of any cross-sectional surface area and/or cross-sectional shape (or of any suitable diameter) may be used. Different sewing materials may be used for different stitches and/or lines of stitches on a single screen or screen assembly. The needle(s) used may be any suitable known needle and may be made of any suitable metal, plastic, composite, and/or fiberglass material. In one particular aspect KEVLAR™ thread with a diameter of 0.009 inches is used. In one particular screen using such KEVLAR™ thread there are three layers of screening material sewn together.

The sewing together of any two or more items may be done according to the present invention by hand, with a manually operated sewing device or machine, or with any automatic sewing machine. Any known sewing stitch or pattern may be used. In certain aspects a sewing needle is used which is sized so that damage to the layers and/or support is minimized or eliminated. In one such aspect, a needle is selected of such size that it penetrates between and moves between adjacent wires or screen components rather than making a dent, gouge, gash, tear or recess in a wire (or screen component) of a screen and rather than breaking or weakening a wire of a screen.

Any stitch or line of sewing material may, optionally, be deleted from the screen assembly 3000 (or from any sewn screen assembly disclosed herein). It is within the scope of this invention to delete all lines 3012, 3014 and all lines sewing together the layers of screening material 3002, 3003, 3004 and to rely on the lines 3010, 3012 and others spaced-apart from them that sew together all of the layers of screening material and the plate 3001. Alternatively between lines like the line 3010, lines like the line 3014 may be used to hold the layers 3002–3004 together (and likewise for lines like 3012 and 3016).

U.S. Pat. No. 4,575,421 refers to an adhesive or bonding that secures parts together. The screen 3000 may be made with no such adhesive or bonding. Alternatively, such adhesive (e.g., but not limited to, glue or epoxy) or bonding may be used in addition to any sewing material described above; or a combination of one or more spaced-apart lines of sewing material and adhesive between and/or on or beneath such lines may be used. In one aspect the layers 3002–3004 may be adhesively secured together and lines like the lines 3010 and/or 3012 used to sew the layers to the plate 3001, or the layers 3002–3004 are sewn together and then adhesively secured to the plate 3001. Any two or more metal layers and/or plate may be sintered together over a portion or over substantially all of this area. One or more separate, individual stitches or knots of sewing material may be used instead of a line of a continuous thread, etc. for any line of sewing material described herein.

FIGS. 23A and 23B show screen assembly 3108 according to the present invention with a perforated plate 3110 (which may be any plate referred to herein and any plate used in the prior art) which has a plurality of apertures, holes or openings 3112 therethrough. A wire mesh layer 3114 is secured to the plate 3110 with thread stitches (or knots) 3115. The layer 3114 may be any known suitable mesh or screen, meshes or screens, with one, two, three, or more layers.

FIGS. 24A and 24B show a screen assembly 3120 according to the present invention with a perforated plate 3121 (like the plate 3110, FIG. 23A) with apertures, etc. 3122 therethrough. Wire or screening mesh layers 3124 are sewn together with thread stitches (or knots) 3126. The layers 3124 are sewn to the plate 3121 with thread stitches (or knots) 3125. Suitable staples may be used for any stitch in the screen assemblies 3108 and 3120.

The plates and screen assemblies of FIGS. 23A and 24A are shown partially; but it is to be understood that the apertures, mesh, stitching and plates are on their entire breadth and surfaces as shown partially.

Figure 12:
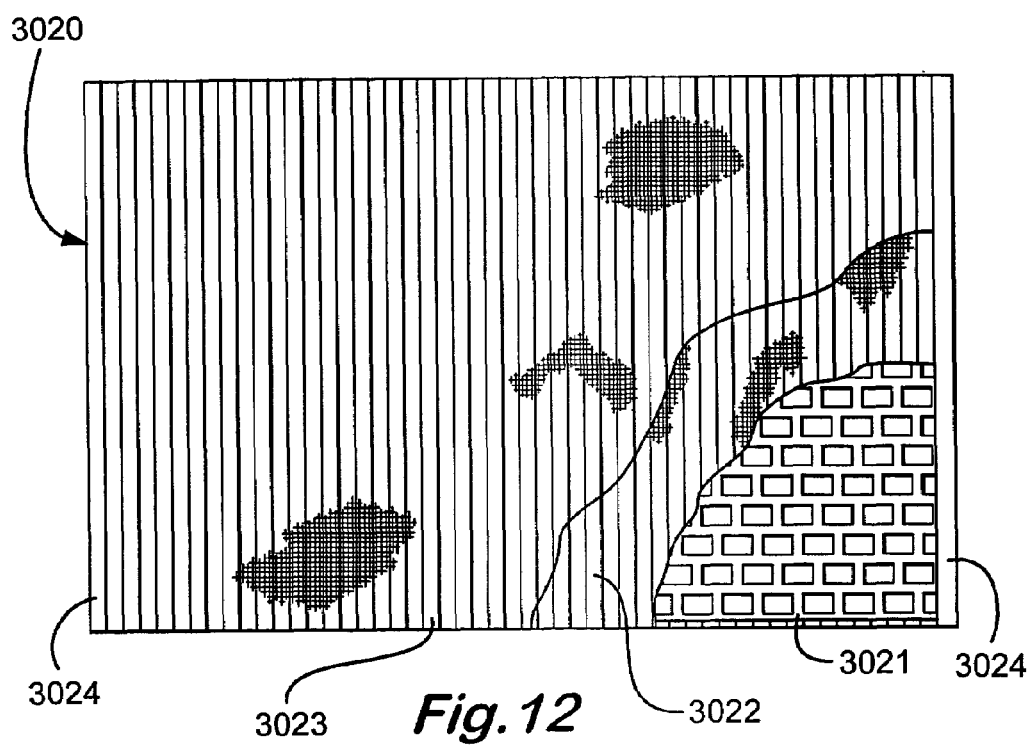
FIG. 12 is a top view of a screen assembly according to the present invention.
Figure 13:
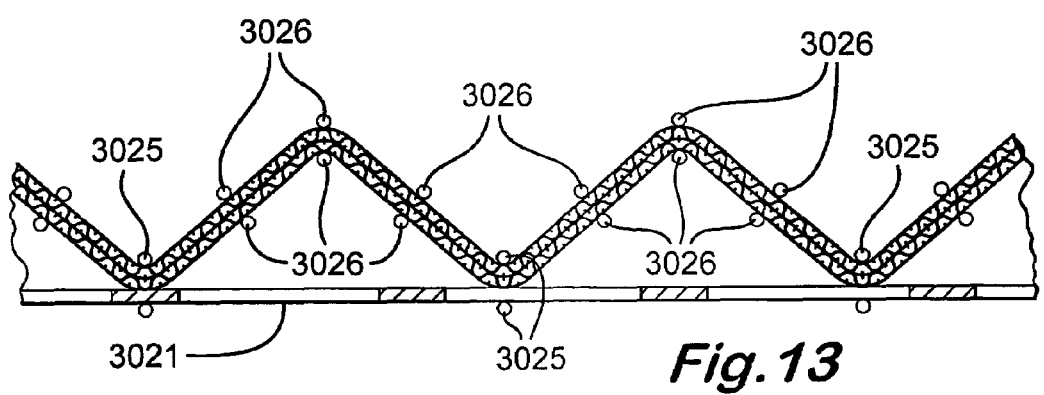
FIGS. 13, 14, 15, 18 and 19 are cross-section views of screen assemblies according to the present invention.

FIGS. 12 and 13 show a screen assembly 3020 according to the present invention which has parts like those of U.S. Pat. No. 5,417,858 (incorporated fully herein for all purposes, including, but not limited to the parts of the screen assembly 3020 which are like parts of the screen assemblies in the patent). However, as described below, various parts of the screen assembly 3020 are held together by sewing material.

The screen assembly 3020 has a plate 3021 (like the plate 3001 described above) on which are positioned a coarse support screen 3022 and a fine screening screen 3023. The screens 3022, 3023 may be, respectively, like the layers 32, 33 in U.S. Pat. No. 5,417,858. Optional sides 3024 may be like the channel shaped members 23 in U.S. Pat. No. 5,417,858 or may be any known hookstrip or frame sides.

Sewing material 3025 is used to sew and secure the layers 3022, 3023 to the plate 3021; and sewing material 3026 may be used to sew and secure the layers 3022 and 3023 together. As shown the size (diameter) of the sewing materials 3025, 3026 (and also of the material of the sewing lines in FIGS. 9–11) is, for some embodiments, greatly exaggerated and could be depicted by a single point in the drawing; but it is within the scope of the present invention to use sewing material—yarn, cord, line, thread, wire, etc.—of any suitable diameter. For any stitch, knot, series or line of stitches and/or series or line of knots disclosed herein for any screen assembly or screen according to the present invention, a staple or a series of staples may be used. Such staple(s) are applied with any suitable known stapling machine or apparatus and/or by hand. Either individual separate stitches or knots of sewing material may be used for the screen assembly 3020 (and for any screen assembly disclosed herein); or lines of sewing material in any desired stitch or stitch pattern (e.g. as the lines of the screen assembly 3000) may be used.

Figure 14:
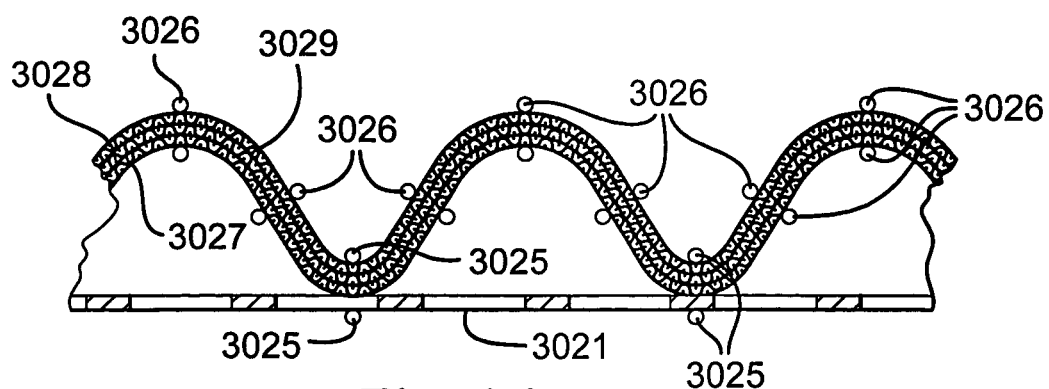

FIG. 14 shows an alternative configuration for the layers of screening material in which ridges and valleys have a more rounded shape (viewed in cross-section) as compared to the screening material of FIG. 13. Also, optionally, a third layer of screening material 3027 is beneath two upper layers of screening material 3028, 3029. A plate 3021*a* is like the plate 3021, FIG. 9. Sewing material 3025*a* is like screening material 3025, FIG. 9 and sewing material 3026*a* is like screening material 3026, FIG. 9. The layers 3027–3029 may be as the layers 77, 79, 80 in U.S. Pat. No. 5,417,858; or they may be made of any desired screening material and/or mesh, metal or synthetic, as may be any layer disclosed herein. In addition to securement together with sewn sewing material, any part or substantially all of the surface area of the layers around openings in the plate 3021 may be bonded or adhered with suitable material, glue or adhesive. In one aspect, screening layers are thus bonded together and the combination of these layers is sewn to the plate, or vice-versa (as can be done with any screen assembly disclosed herein).

Figure 15:
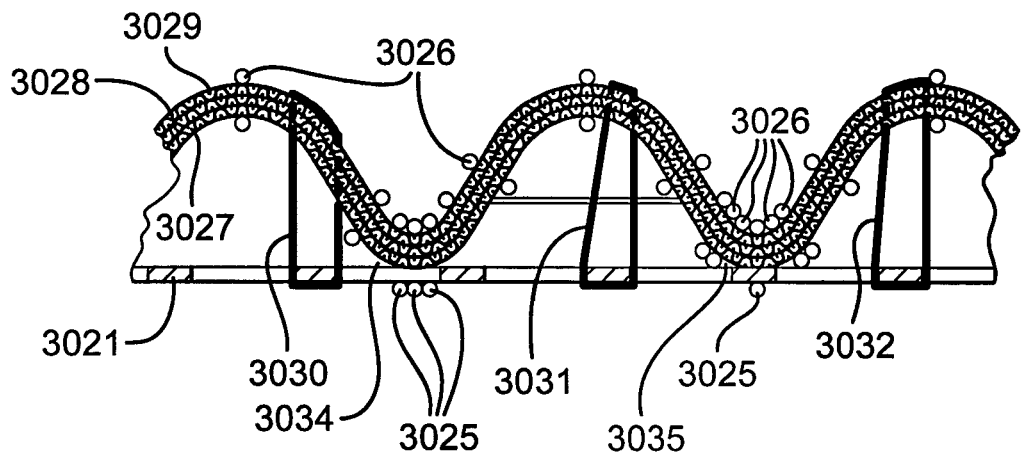

FIG. 15 illustrates a version of the screen assembly of FIG. 14 in which one or more individual stitches 3030–3032 extends through and from the screening layers 3027–3029 to and through holes or perforations the plate 3021 beneath and within ridges formed by the undulating shape of the screening material. Any desired number of such individual stitches or knots may be used within a ridge, e.g. one, two, three, four, five, or more; or a series of them may be beneath a ridge extending from one end thereof to the other. Also, the sewing material may extend through all the layers of screening material or through only one or two layers. If the sewing material is metal and the plate is also, the sewing material may be sintered to the plate; similarly, with metal screening material and metal sewing material the sewing material may be sintered to the screening material.

FIG. 15 also illustrates that an area of excessive wear or abrasion in a screen assembly (any according to the present invention) may have a plurality of either individual stitches or knots of sewing material or a line of a plurality of sewn stitches. As shown in the left-most valley 3034 of FIG. 15, three stitches of sewing material 3025 are located in the valley. As shown in the right-most valley 3035 five stitches of sewing material 3026 secure the screening layers together at this location. Also, the tops of ridges of an undulating or corrugated screen assembly may have such a plurality of stitches or knots, an individual stitch or knot, or an individual staple or staples. It is within the scope of this invention to use any desired number of stitches and/or lines of stitches in any area of a screen assembly and, in one aspect, to do so for areas of anticipated excessive wear and abrasion.

Figure 16:
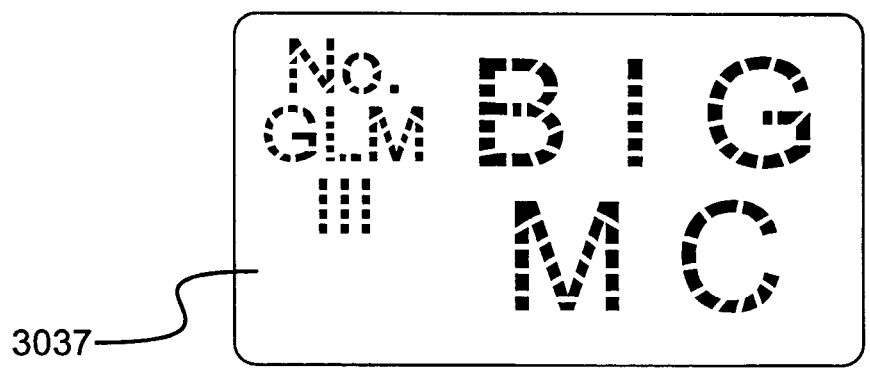
FIG. 16 is a top view of a screen assembly according to the present invention.

FIG. 16 illustrates that according to the present invention a screen identifier—"No. GLM III"—and/or a logo or trademark—"BIG MC"—can be sewn into a screen 3037. The screen 3037 can be single or multi-layer (and can be any screen assembly disclosed herein).

Figure 17:
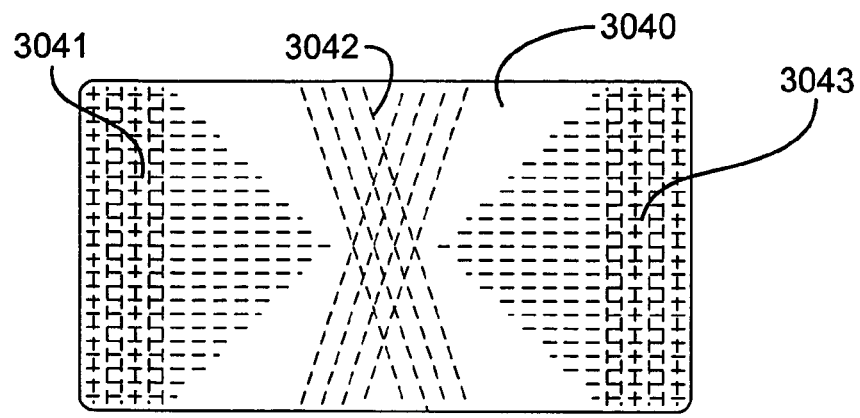
FIG. 17 is a top view of a screen assembly according to the present invention.
Figure 18:
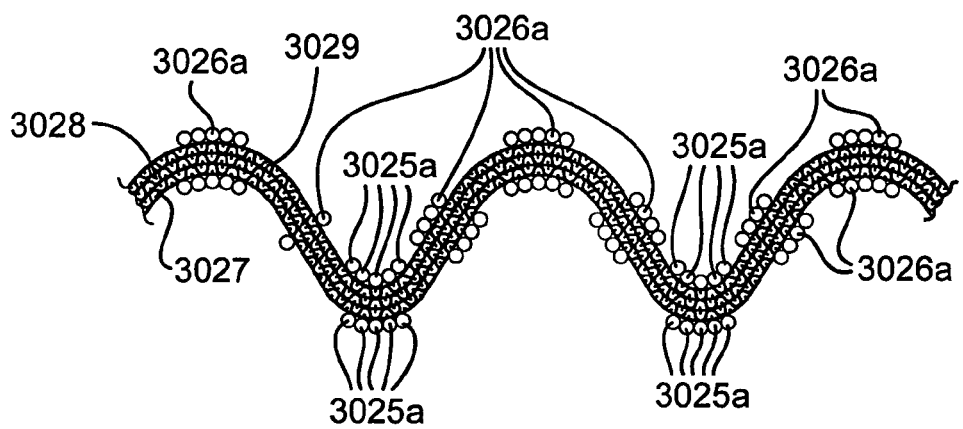

FIG. 17 illustrates a screen 3040 according to the present invention which has different stitching patterns 3041, 3042, 3043 with different stitch densities in different areas of a screen. The screen 3040 may be any screen or screen assembly disclosed herein and the sewing material for the stitches may be any sewing material disclosed herein. Any one or two of the patterns 3041–3043 may be deleted. It is also within the scope of this invention to use any desired pattern of stitching at any location on a screen.

It is also within the scope of this invention to delete the plates (3001, 3021) from the embodiments of FIGS. 9 and 12 and to use a plurality of stitches, knots, and/or lines thereof (all in one general direction parallel to each other or a plurality of intersecting lines) instead of such a plate; and such a plurality of stitches, etc., is not a legal equivalent of any frame or of any plate as in U.S. Pat. Nos. 4,575,421; 5,783,077; 5,720,881; 5,417,793; 5,417,859; or U.S. Pat. No. 5,417,858. It is also within the scope of this invention to delete the plate or frame from any of the subject matter of U.S. Pat. Nos. 4,575,421; 5,783,077; 5,720,881; 5,417,793; 5,417,859; and 5,417,858 (or from any known flat or 3-D screen assembly) and to use instead a plurality of stitches, knots, and/or lines of sewn sewing material. FIG. 16 shows a version of a screen as in FIG. 14 but with no plate 3021. Pluralities of lines (as viewed from above) of stitching material 3025*a* and 3026*a* extend across the screen assembly from one side to the other. Other lines (not shown) may be provided at an angle or perpendicular to these lines of material 3025*a* and 3026*a*.

Figure 19:
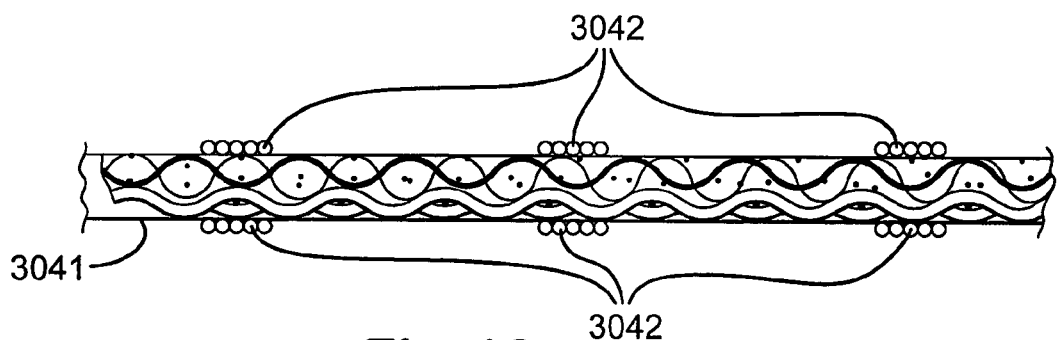

FIG. 19 shows a flat screen 3041 with layers as in U.S. Pat. No. 4,575,421 (or any multi-layer screen disclosed or referred to herein), but with no lower plate. Lines of stitching 3042 extend across the screen 3041 from one side to the other. Other lines (not shown) may be provided at an angle or perpendicular to the lines 3042. As shown in FIG. 14, a stitch or line of sewing material 3045 may be used to prevent a ridge of screening material from expanding and/or flattening. Any desired number of such lines or stitches may be used along the length of a ridge (including any ridge or ridges of a series of ridges on any screen including any screen disclosed herein).

Figure 20B:
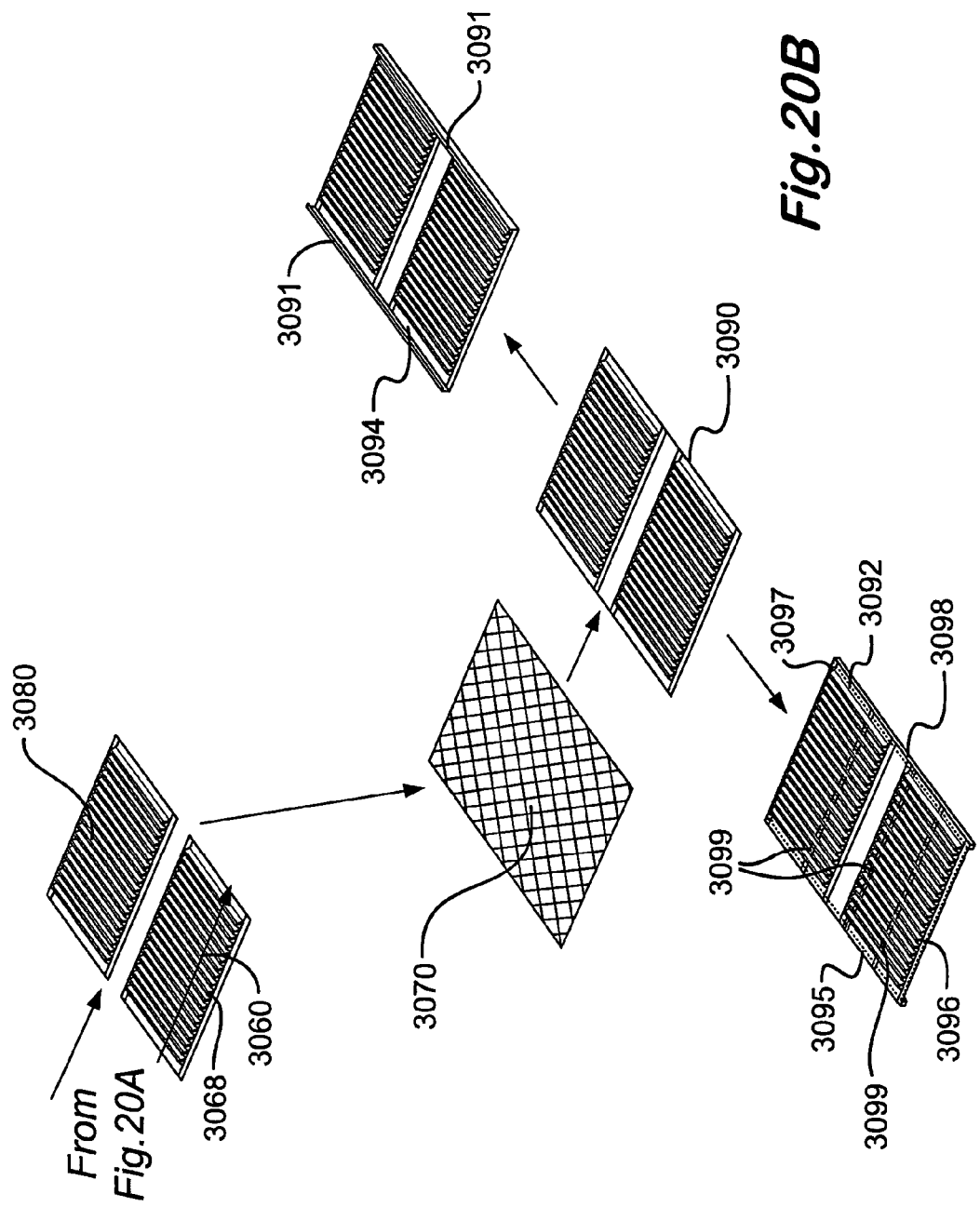
FIGS. 20A and B are schematic views showing a method according to the present invention for making screen assemblies according to the present invention.

FIGS. 20A and 20B illustrate steps in a method according to the present invention for producing screen assemblies according to the present invention. A piece of screening material 3052 of relatively fine mesh (e.g., but not limited to, 24 mesh to 500 mesh; made, e.g., of metal, steel, stainless steel, natural fiber such as cotton, or synthetic material such as nylon, polyester, polypropylene, polyethylene, or KEVLAR™ material) is combined with a piece of screening material 3054 of a medium mesh (e.g., but not limited to, 32 mesh to 400 mesh made, e.g. of the materials as for piece 3052) and a piece of screening material 3056 of coarse mesh (e.g., but not limited to, 1 mesh to 30 mesh made, e.g., of the materials as for piece 3052). It is within the scope of this invention to add an additional layer of screening material as any of the pieces 3052, 3054, 3056 and to position it on top of any of the other pieces present. It is within the scope of this invention to delete any of the pieces 3052, 3054, or 3056. The straight sides of the glue pattern 3058 may be deleted.

Optionally a glue pattern, e.g. as in the glue pattern 3058 is applied to the screening material piece 3052. Alternatively, or additionally, such a glue pattern is applied to piece 3054 and/or piece 3056. Glue (or any suitable plastic, flexible adhesive, or fusible material) in any pattern or configuration may be used for the glue pattern. In certain aspects a glue pattern is applied over substantially the entire area of piece(s) of screening material, in one aspect to coincide with a stitching pattern, so that it a. inhibits during handling or use tearing of screening material between stitches and/or holes made by a sewing needle; b. seals around sewing material, etc.; and/or c. so that glue "heals" holes made by a sewing needle passing through the glue when the needle is retracted—i.e., the glue around a hole tends to contract somewhat back into the hole reducing the hole size or substantially closing off the hole. Glues and materials that may be used include any known in the art, any disclosed above, and, PUR glues, polyethylene, rubber, nylon, plastic, polyurethane, silicone, any suitable adhesive and epoxy. Optionally a piece of solid plastic corresponding to the stitching pattern, with or without perforations over its surface area, is used instead of or in addition to a glue pattern. Any glue, epoxy, or other adhesive may be used solely to prevent tearing; or it may also, in certain aspects, be applied in such a manner that it also bonds screening layers together and/or to a lower plate, frame, or support. A solid plastic piece may be molded with perforations or the perforations may be made after the piece is made.

Optionally strips 3063 of screening material may be applied along edges of the piece 3052 (and/or along edges of any of the other pieces 3054, 3056) for a purpose described in detail below. The strips 3063 are also shown on the piece 3052.

The combined structure 3050 (including pieces 3052, 3054, 3056) is glued or bonded together or sewn together in any manner as described herein using any stitch or sewing pattern as described herein. In one aspect, the stitching follows the glue pattern 3058 with the needle or needles piercing the glue. Such a structure, without further processing, is substantially flat and may be used in a substantially flat screen assembly. It is within the scope of this invention to sew together only the pieces 3052, 3054 or 3056 and to glue or bond the other piece to them.

In one aspect the structure 3050 is, optionally, notched, with notches 3059 along its edges, and is also corrugated. Prior to corrugating, one or more splines of epoxy or plastic 3067 may be applied to the structure for added strength and rigidity. Alternatively or in addition to the splines, additional lines of sewing stitches may be used. Ends 3064 of ridges 3066 of the corrugated structure are either plugged, covered with material (perforated or unperforated, solid or mesh or screening material), or, as shown, ends 3068 are formed of the screening material. Alternatively, an additional strip or strips of screening material, mesh, or a combination thereof (as described above) are added (e.g., but not limited to the strips 3063) and the ridge end coverings are formed of these strips. In one aspect the formed ends are the ends and/or bulbous ends described in co-owned pending U.S. application Ser. No. 09/634,610 filed Aug. 5, 2000 and incorporated fully herein for all purposes. Any screen or screen assembly in U.S. Ser. No. 09/634,610 may have layers connected together by sewing as described herein.

The resulting structure 3060 may, according to the present invention, be combined with a lower support mesh piece 3070 [e.g. made of steel, wire, composite, or other suitable (zinc, brass, bronze, aluminum, or any alloy thereof or combination thereof) material or metal with mesh ranging between one mesh and ten mesh, in one aspect four mesh] or with a lower support plate or series of support strips. Flat top wire cloth may be used for the piece 3070.

In one aspect a screen assembly 3080 (like the structure 3060) is mounted with the structure 3060 on a piece 3070, producing a screen assembly 3090 (like screen assemblies disclosed in U.S. application Ser. No. 09/634,610 filed Aug. 5, 2000). The piece 3070 may be connected to the other parts by sewing as described herein; by welding; with fasteners; and/or with glue or epoxy.

A version 3094 of the screen assembly 3090 has side hookstrips 3091 for mounting of the screen assembly to a vibratory separator for liquid/solid and/or solid/solid separation e.g., but not limited to, a shale shaker for treating drilling fluid or mud with drilling solids, debris, and/or cuttings entrained therein. A version 3092 of the screen assembly 3090 includes a frame with sides 3095, 3096, 3097 and 3098. Optionally cross support members 3099 may be included in the frame.

FIG. 26 shows a screen assembly 3100 according to the present invention which is like the screen assembly of FIG. 9 (like numerals indicate like parts). Instead of the thread and stitching of the screen assembly of FIG. 9, the screen assembly 3100 has lines of staples (or rivets) 3102, 3104 and 3106, 3108.

Figure 27:
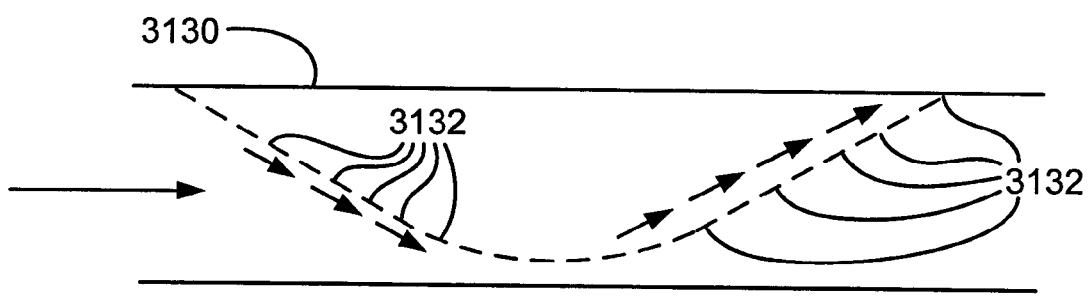
FIG. 27 is a side view of a ridge of three-dimensional screen assembly according to the present invention.

In certain aspects the thread, etc. used for three-dimensional screens and screen assemblies of the present invention is used in such a pattern and location that it presents a projecting series of thread parts that project out from ridges of a screen. Viewing such a ridge 3130 from the side as shown in FIG. 27, the thread portions 3132 direct solids flowing generally in the direction of the arrow in FIG. 27 up or down the ridge. This increases the length of travel of these solids from one end of the screen to the other (they do not travel in a straight line across the screen) and thereby increases their time on the screen surface so that liquids have more time to leave the solids and pass through the screen.

Any ramp base or portion described above that is connected to a screen, mesh, or layers thereof may be connected by sewing (or staples) above as described above; or in addition to the connection or securement method previously described sewing (or staples) as described above may also be used.

The present invention, therefore, provides in certain, but not necessarily all embodiments, a screen assembly for a vibratory separator apparatus or shaker, the screen assembly with at least two screening members, and the at least two screen members connected by sewing material. Such a method may include one or some of the following, in any possible combination: the at least two screening members comprise a plurality of layers of screening material; the plurality of layers of screening material include at least a first fine screen layer and a second coarse screen layer; wherein the sewing material is thread; wherein the sewing material comprises a pattern of spaced-apart stitches over substantially the entire surface of the at least two screen members; wherein one of the at least two screen members is a perforated plate; wherein the at least two screening members includes at least one three-dimensional screening member; wherein the at least one three-dimensional screening member is made of screening material; wherein the screening material is a plurality of layers of screening material; one of the at least two screening members comprising a base, and the plurality of layers of screening material connected to the base; wherein the base is a perforated plate; wherein the plurality of layers of screening material are connected to the base with sewing material; the sewing material comprises a plurality of spaced-apart staples; wherein the base is a layer of coarse mesh; wherein the at least two screening members is at least two layers of screening material and a perforated base, the at least two layers of screening material sewn together to form a combined screen, the combined screen sewn to the perforated base; the sewing material comprising thread in a stitch pattern across the at least two screening members, a pattern of expandable material (e.g. rubber, glue, plastic, etc.) on and corresponding to the stitch pattern, and the thread passing through holes in the pattern of expandable material, the expandable material expanded within the holes following extraction of a needle therefrom, the needle used to apply the sewing material, to inhibit tearing of either of the at least two screening members between holes; multiple stitches of sewing material adjacent each other in areas of increased wear of the screen assembly; and/or wherein the at least two screening members includes three-dimensional screening material with a plurality of alternating ridges and troughs, at least one series of stitches of sewing material ascending up a side of a ridge from a top to a bottom thereof, and the at least one series of stitches having stitch portions projecting out from an outer surface of the ridge for contact by solid particles flowing over the screen assembly to change direction of travel of the solid particles.

The present invention, therefore, provides in certain, but not necessarily all embodiments, a screen assembly for a vibratory separator apparatus, the screen assembly with at least two screening members, and the at least two screen members connected by sewing material, wherein the sewing material comprises thread, the sewing material comprising thread in a stitch pattern across the at least two screening members, a pattern of expandable material on and corresponding to the stitch pattern, the thread passing through holes in the pattern of expandable material, the expandable material expanded within the holes following extraction of a needle therefrom, the needle used to apply the sewing material, to inhibit tearing of either of the at least two screening members between holes, the at least two screening members including three-dimensional screening material with a plurality of alternating ridges and troughs, at least one series of stitches of sewing material ascending up a side of a ridge from a top to a bottom thereof, and the at least one series of stitches having stitch portions projecting out from an outer surface of the ridge for contact by solid particles flowing over the screen assembly to change direction of travel of the solid particles.

The present invention, therefore, provides in certain, but not necessarily all embodiments, a vibratory separator apparatus including a vibratory shaker device, a screen assembly mounted on the vibratory shaker device and with at least two screening members, and the at least two screen members connected by sewing material.

The present invention, therefore, provides in certain, but not necessarily all embodiments, a method for treating material, the method including introducing the material to a vibratory separator apparatus, the vibratory separator apparatus with a vibratory shaker device, a screen assembly mounted on the vibratory shaker device and with at least two screening members, and the at least two screen members connected by sewing material, and screening the material with the at least two screening members to separate components thereof, the at least two screening members vibrated by the vibratory shaker device. In one aspect in such a method the material is drilling fluid with solids therein.

Figure 25:
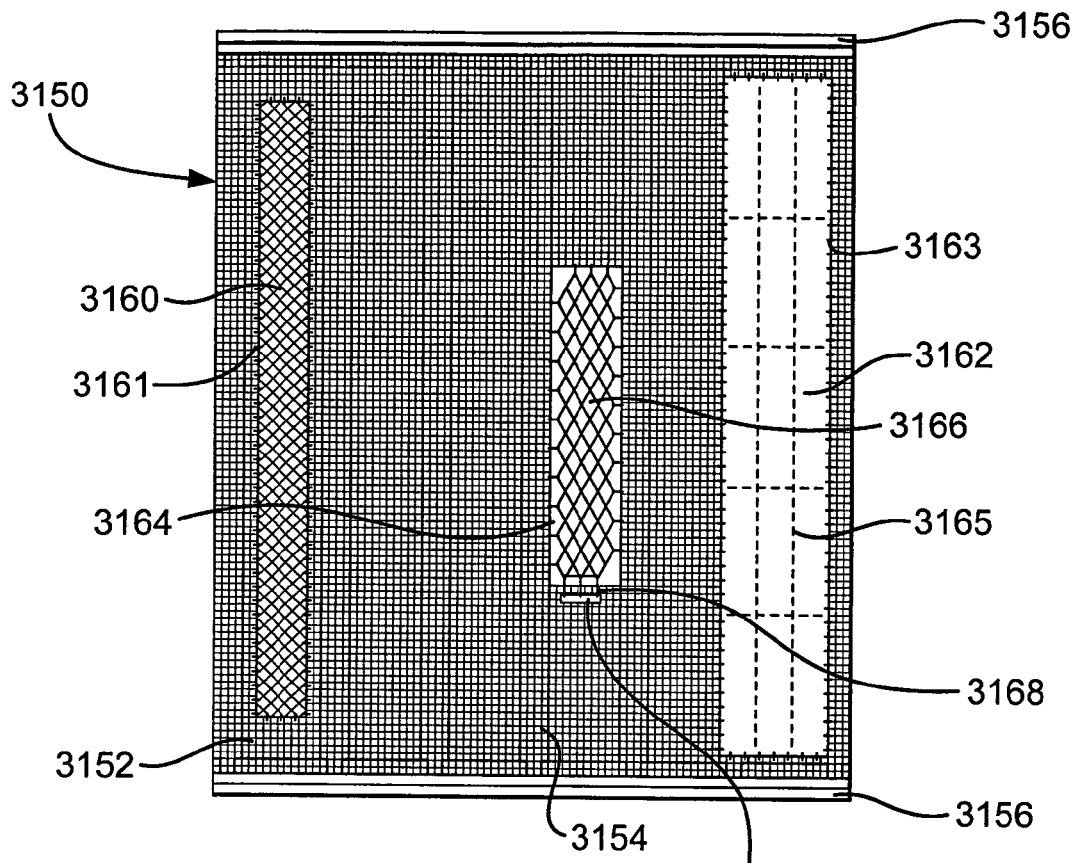
FIG. 25 is a top view of a screen assembly according to the present invention.

FIG. 25 shows a screen assembly 3150 according to the present invention which has a layer of screening material 3152 over a series of support strips 3154. Side hook strips 3156 provide for mounting of the screen assembly. Alternatively, a frame or perforated plate may be used (although there are not legal equivalents of a series of support strips and they are not the legal equivalent of a screen with layers sewn together and they are not the legal equivalent of a lower supporting coarse mesh). The screening material 3152 may be: any screening material or mesh disclosed herein or any combination of layers thereof disclosed herein or any suitable layer or layers of screening material.

A piece 3160 of screening material is sewn (or connected with rivets and/or staples) to the screening material 3152 with stitching 3161. A solid piece of material 3162 is sewn to the screening material 3152 with stitching 3163, 3165. A perforated piece of material 3164 with a plurality of perforations 3166 is sewn to the screening material 3152. Any one or two of the pieces 3160, 3162, 3164 may be deleted. Stitches 3168 sewing the piece 3164 are surrounded by an amount of glue 3170 that extends around stitch holes through the piece 3164 and around portions of stitches through the screening material 3152.

It is within the scope of this invention for any hole for any sewing material, rivet or staple to have such glue as glue 3170 around it or any other material that will contract around the sewing material, etc. upon removal of a needle and will contract around a part of a rivet or staple to help "heal" a hole and to seal around the material, etc.

It is within the scope of this invention to have a plurality of pieces like the piece 3160 (two, three, four, five, six or more) spaced-apart on the screening material 3152. Similarly there may be multiple pieces 3162 and/or 3164 in any position or desired combination with or without pieces 3160. In certain aspects a piece or pieces 3160, 3162, and/or 3164 are wed at locations of relatively high or excessive screen wear. Any such piece or pieces may be used on any two-dimensional or three-dimensional screen, either on top of or beneath (or both) screening material.

Figure 28A:
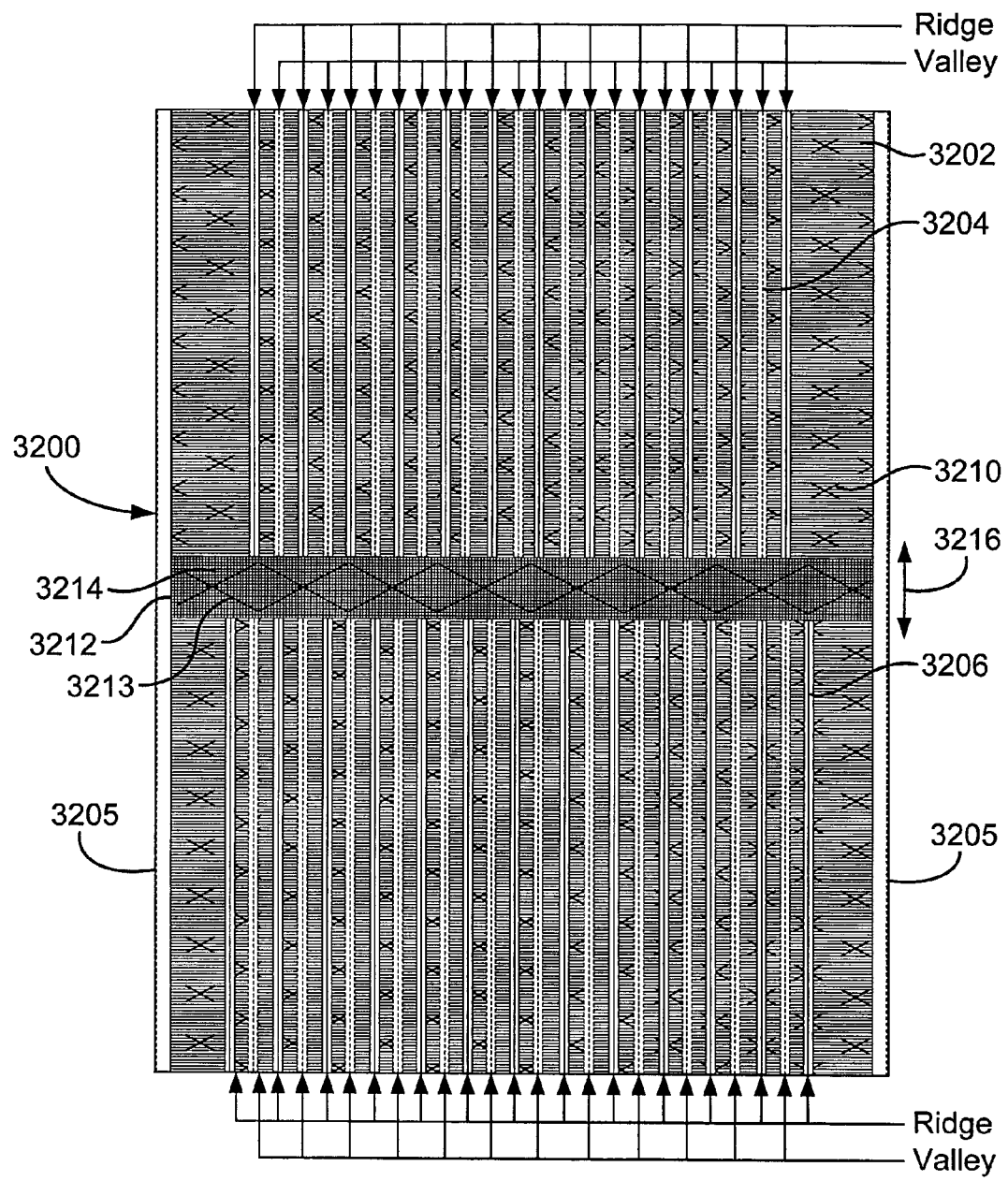
FIG. 28A is a top view of screen assembly according to the present invention.
Figure 28B:
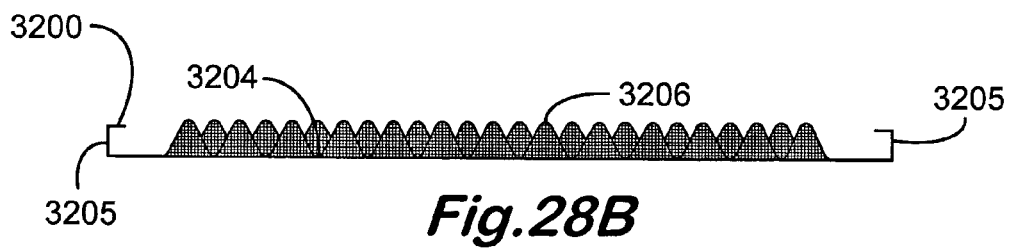
FIG. 28B is an end view of the screen assembly of FIG. 28A.

FIGS. 28A and 28B show a screen assembly 3200 according to the present invention which has a layer 3202 of coarse mesh and side hooks strips 3205. On the coarse mesh layer 3202 are sewn two offset series of ridges/valleys 3204, 3206.

Sewing material 3210 is sewn in a desired pattern across substantially all of the surface area (as viewed from above as in FIG. 28A) of the screen assembly.

A middle portion or strip 3212 of the screen assembly 3200 includes a layer 3214 of fine mesh (e.g. but not limited to 200 mesh) on a layer of less-fine mesh (e.g. but not limited to 19 mesh, not shown). These two layers extend for a length 3216. A similar strip (like the strip 3212) is used at each end 3218, 3219 of the screen assembly 3200 between the ridge/valley parts and the coarse layer 3202.

The sewing material 3210 may be used only in selected areas of the screen assembly instead of over substantially all of its area. Glue or other material may be used in the same pattern as the stitching to close off and/or "heal" or seal holes or the area around the outer surface of stitching material (or rivets or staples). In one aspect the sewing material is KEVLAR™ thread between 0.063 and 0.045 inches in diameter. Thread of circular, oval, or elliptical cross-section may be used. For any screen or screen assembly herein, the sewing material may be any thread, including but not limited to moisture-resistant or moisture-absorbing thread or may be any wire of circular, oval, or elliptical cross-section. In another aspect, ends of peaks and valleys, instead of being located at the end boundaries of the screen assembly as shown in FIG. 28A, are spaced-apart from their ends. In one particular aspect of such a screen assembly, the peaks and valleys ends are formed integrally of screening material that is pushed out from an initial relatively flat layer or layers so that there are never any open ends that need to be closed off or sealed (as for the example the open ends of the screen assemblies of U.S. Pat. Nos. 5,417,793; 5,417,858; 5,417,859).

In one particular embodiment of the screen 3200 the ridge/valley portions 3204, 3206 are made from multi-layer pieces of screening material sewn together with ridges with integral bulbous ends pushed out from the screening material. The ridge/valley portions 3204, 3206 are then placed on the strips 3212 and the end strips (like the strip 3212) and sewn thereto. The resulting structure is then sewn to the layer 3202. alternatively the structure may be produced by gluing or using epoxy to bond layers together (which is not the legal equivalent of mechanically connecting the layers together with sewing material, rivets, or staples). Alternatively the structure (sewn or bonded) may be connected to the coarse layer by gluing or using epoxy—or both methods may be used on a single screen assembly.

In any screen according to the present invention when sewing material (rivets, or staples) is used instead of glue, epoxy, or plastic and the surface area of the thread presented to material to be treated is less than that of the glue, epoxy, or plastic, then there is that much more increased open area of screening material for screening the material to be treated. Also with such a screen according to the present invention there is more relative movement between layers which tends to reduce or prevent screen blinding and plugging. Certain pipe dopes stick to plastic on a screen and inhibit the conveyance of solids—which is reduced by using non-plastic sewing material in certain screens according to the present invention. According to the present invention screens with different thread or other sewing material can be quickly changed in response to changes in conditions such as temperature changes, fluid changes, or chemical changes. Alternatively, or in addition to sewing the pieces of the strips 3212 and the end strips together, the pieces may be bonded together with epoxy 3213. Similarly epoxy may be used to bond the layer 3202 to the other parts. The ends of the ridge/valley portions 3204, 3206 (when there are initially open ends) may be closed off in any known manner with plugs, screening material, etc. In certain aspects this may be done with screening material of a mesh size like that of the ridge/valley portions. Sewing material, rivets, and staples are not the legal equivalent of each other. Any ramp disclosed herein may be attached to a lower support or lower layer by any sewing method disclosed herein (or by rivets and/or staples). Any end of any screen disclosed herein that is initially open may be closed off and/or sealed by connecting material over the open end by any sewing method and/or rivets, and/or staples disclosed herein.

The present invention, therefore, provides in at least certain embodiments a method for making a screen assembly for a vibratory separator, the method including sewing together with sewing material at least two layers of fine screening material, placing said sewn-together at least two layers of fine screening material in a heating apparatus, placing a coarse mesh layer on the at least two layers of screening material on the heating apparatus, placing on the coarse mesh layer a support with heat activated material thereon for adhering the support to the coarse mesh layer, and heating the coarse mesh layer, the at least two layers of fine screening material, and the support to adhere the support to the coarse mesh layer and the at least two layers of fine screening material to the coarse mesh layer.

The present invention, therefore, provides in at least certain embodiments a method for separating components of a fluid, the method including introducing the fluid to a vibratory separatory, the vibratory separatory with a screen assembly mount, vibrating apparatus for vibrating the screen assembly mount, and a screen assembly mounted to the screen assembly mount, the screen assembly made by any method disclosed herein according to the present invention, and vibrating the screen assembly mount thereby vibrating the screen assembly as the fluid is fed onto the screen assembly.

The present invention, therefore, provides in at least certain embodiments a screen assembly for a shale shaker for treating drilling fluid with solids therein, the shale shaker having a basket for holding a screen assembly, a vibratory device for vibrating the basket and the screen assembly, and a lower receptacle for receiving drilling fluid passing through the screen assembly, the screen assembly having at least two screening members, each screening member having a surface area, the screen assembly having a top, the at least two screening members connected by sewing material, the screen assembly mountable on the basket so that solids separated from the drilling fluid are moved off the top of the screen assembly by motion imparted to the screen assembly by the vibratory device.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A screen assembly for a shale shaker for treating drilling fluid with solids therein, the shale shaker having a basket for holding a screen assembly, a vibratory device for vibrating the basket and the screen assembly, and a lower receptacle for receiving drilling fluid passing through the screen assembly, the screen assembly comprising
   at least two screening members, each screening member having a surface area, the screen assembly having a top,
   the at least two screening members connected by sewing material,
   the screen assembly mountable on the basket so that solids separated from the drilling fluid are moved off the top of the screen assembly by motion imparted to the screen assembly by the vibratory device,
   the sewing material comprising thread in a stitch pattern across the at least two screening members,
   a pattern of expandable material on and corresponding to the stitch pattern, and
   the thread passing through holes in the pattern of expandable material, the expandable material expanded within the holes following extraction of a needle therefrom, the needle used to apply the sewing material, to inhibit tearing of either of the at least two screening members between holes.

2. The screen assembly of claim 1 wherein the sewing material extends across substantially all of the surface area of the at least two screening members.

3. The screen assembly of claim 1 wherein the at least two screening members comprise a plurality of layers of screening material.

4. The screen assembly of claim 3 wherein the plurality of layers of screening material include at least a first fine screen layer and a second coarse screen layer.

5. The screen assembly of claim 1 wherein the sewing material comprises thread.

6. The screen assembly of claim 1 wherein the sewing material comprises a pattern of spaced-apart stitches over substantially all surface area of the at least two screening members.

7. The screen assembly of claim 1 wherein one of the at least two screening members is a perforated plate.

8. The screen assembly of claim 1 wherein the at least two screening members includes at least one three-dimensional screening member.

9. The screen assembly of claim 8 wherein the at least one three-dimensional screening member is made of screening material.

10. The screen assembly of claim 9 wherein the screening material comprises a plurality of layers of screening material.

11. The screen assembly of claim 10 further comprising
    one of the at least two screening members comprising a base, and
    the plurality of layers of screening material connected to the base.

12. The screen assembly of claim 11 wherein the base is a perforated plate.

13. The screen assembly of claim 12 wherein
    the plurality of layers of screening material are connected to the base with sewing material.

14. The screen assembly of claim 11 wherein the base is a layer of coarse mesh.

15. The screen assembly of claim 1 wherein
    the at least two screening members comprise at least two layers of screening material and a perforated base, the at least two layers of screening material sewn together to form a combined screen, the combined screen sewn to the perforated base.

16. The screen assembly of claim 1 further comprising multiple stitches of sewing material adjacent each other in areas of increased wear of the screen assembly.

* * * * *